(12) United States Patent
Katagiri et al.

(10) Patent No.: US 8,339,468 B2
(45) Date of Patent: Dec. 25, 2012

(54) IMAGE PROCESSING DEVICE, IMAGE PROCESSING METHOD, AND IMAGE PICKUP APPARATUS

(75) Inventors: Tetsuya Katagiri, Kyoto (JP); Koichi Kamon, Otokuni-gun (JP)

(73) Assignee: Konica Minolta Opto, Inc., Tokyo (JP)

( * ) Notice: Subject to any disclaimer, the term of this patent is extended or adjusted under 35 U.S.C. 154(b) by 303 days.

(21) Appl. No.: 12/198,384

(22) Filed: Aug. 26, 2008

(65) Prior Publication Data

US 2009/0059026 A1    Mar. 5, 2009

(30) Foreign Application Priority Data

Aug. 30, 2007    (JP) .................................. 2007-224155

(51) Int. Cl.
*H04N 5/228* (2006.01)
*H04N 5/445* (2011.01)
*G06K 9/36* (2006.01)
*G06K 9/40* (2006.01)

(52) U.S. Cl. ..................... 348/222.1; 348/568; 382/166; 382/264

(58) Field of Classification Search ............... 348/222.1, 348/254, 671–686; 379/68
See application file for complete search history.

(56) References Cited

U.S. PATENT DOCUMENTS

| | | | |
|---|---|---|---|
| 6,807,316 B2 * | 10/2004 | Enomoto | 382/264 |
| 6,927,884 B2 | 8/2005 | Takada et al. | 358/513 |
| 2002/0006230 A1 * | 1/2002 | Enomoto | 382/261 |

FOREIGN PATENT DOCUMENTS

| | | | |
|---|---|---|---|
| JP | 63-306779 A | | 12/1988 |
| JP | 2000-050081 A | | 2/2000 |
| JP | 2000-149014 A | | 5/2000 |
| JP | 2000-152033 A | | 5/2000 |
| JP | 2000-165754 A | | 6/2000 |
| JP | 2000-165755 A | | 6/2000 |
| JP | 2003060913 | * | 8/2001 |

(Continued)

OTHER PUBLICATIONS

E. H. Land et al, "Lightness and Retinex Theory", Journal of the Optical Society of America, vol. 61, No. 1 (Jan. 1971), pp. 1-11.

(Continued)

*Primary Examiner* — James Hannett
*Assistant Examiner* — Stephen Coleman
(74) *Attorney, Agent, or Firm* — Cozen O'Connor

(57) ABSTRACT

In an image processing device, an image processing method, and an image pickup apparatus according to an aspect of the invention, a compression characteristic is generated based on one of multiple smoothed images to be generated based on an input image, and a compressed base component image having a smaller dynamic range than the dynamic range of a base component image is generated by using the compression characteristic. The image processing device, the image processing method, and the image pickup apparatus enable to more advantageously define a proper compression characteristic, and compress the dynamic range of the input image in a simplified manner and with high quality, as compared with the background art.

11 Claims, 10 Drawing Sheets

FOREIGN PATENT DOCUMENTS

| | | | |
|---|---|---|---|
| JP | 2001-298619 A | 10/2001 |
| JP | 2002-77733 A | 3/2002 |
| JP | 2003-008898 A | 1/2003 |
| JP | 2003-008935 A | 1/2003 |
| JP | 2003-060913 A | 2/2003 |
| JP | 2003008898 | * | 10/2003 |
| JP | 3750797 B2 | 12/2005 |
| JP | 2007-082181 A | 3/2007 |

OTHER PUBLICATIONS

Japanese Notice of Reasons for Rejection dated Apr. 12, 2011, for counterpart Japanese Application No. 2007-224155, together with an English translation thereof.

Notice of Reasons for Rejection dated Oct. 11, 2011, issued in the corresponding Japanese application, No. 2007-24155.

* cited by examiner

IMAGE PROCESSING DEVICE, IMAGE PROCESSING METHOD, AND IMAGE PICKUP APPARATUS

This application is based on Japanese Patent Application No. 2007-224155 filed on Aug. 30, 2007, the contents of which are hereby incorporated by reference.

BACKGROUND OF THE INVENTION

1. Field of the Invention

The present invention relates to an image processing device for compressing the dynamic range of an input image, an image processing method for compressing the dynamic range of an input image, and an image pickup apparatus incorporated with the image processing device.

2. Description of the Related Art

In recent years, in an image pickup apparatus adapted as a digital camera, such as a digital still camera or a digital video camera, as a demand for high-quality performance is increased, there is a demand of increasing the luminance range i.e. the dynamic range of a subject image. Various techniques for increasing the dynamic range have been studied and developed. The luminance range corresponds to a difference between a lowest luminance and a highest luminance, and in the case of an image, the luminance range corresponds to a difference between a lowest density and a highest density.

Japanese Unexamined Patent Publication No. Sho 63-306779 (D1) discloses a technique, for increasing the dynamic range, comprising: shooting multiple images having different exposure amounts, selecting image portions having a proper exposure level from the multiple images, and combining the selected image portions. Japanese Unexamined patent Publication No. 2000-165754 (D2) discloses a technique, for increasing the dynamic range, comprising: storing signal charges accumulated in a photoelectric converter by a one-time exposure in multiple capacitances, reading out the signal charges stored in the capacitances having different capacities, and summing up the readout signal charges. Japanese Unexamined Patent Publication No. 2000-165755 (D3) discloses a technique, for increasing the dynamic range, comprising: converting a signal charge transferred from a photoelectric converter into a signal voltage by a charge-voltage converter constituted of multiple capacitances having different voltage dependencies.

U.S. Pat. No. 6,927,884 corresponding to Japanese Unexamined Patent Publication No. 2002-77733 (D4) discloses a solid-state image sensing device, for increasing the dynamic range, comprising: a photosensitive member operable to generate a photocurrent in accordance with an incident light amount; an MOS transistor for receiving the photocurrent; and a biasing member for biasing the MOS transistor to such a state that a sub-threshold current is allowed to flow, wherein the photocurrent is logarithmically converted into an electric signal in accordance with the incident light amount for outputting the electric signal. D4 proposes a solid-state image sensor for converting a photocurrent into a logarithmic voltage by using a sub-threshold characteristic of the MOS transistor for increasing the dynamic range, wherein an output characteristic inherent to the solid-state image sensor is automatically switched between a linear condition where a photocurrent is linearly converted into an electric signal in accordance with the incident light amount for outputting the electric signal, and the aforementioned logarithmic condition, by applying a specific reset voltage to the MOS transistor.

Under the aforementioned circumstances that the technique for increasing the dynamic range has progressed in the field of image pickup apparatuses, in a current technical standard, however, there is a case that the dynamic range (i.e. the bit number for expressing the pixel level) in a device for transferring, accumulating, or displaying an image is relatively narrow, as compared with the dynamic range in the image pickup apparatus. In the above occasion, even if the dynamic range in the image pickup apparatus is successfully increased, it may be difficult to utilize the entirety of the obtained information. Accordingly, a dynamic range compression technique for converting an image having a wide dynamic range into an image having a smaller dynamic range has also been studied and developed.

A number of dynamic range compression techniques based on the Retinex theory (E. H. Land, J. J. McCann, "Lightness and retinex theory", Journal of the Optical Society of America 61(1), 1 (1971)) have been reported. According to the Retinex theory, whereas light to be incident to a human eye is determined by a product of illumination light and a reflectance of an object, visual sensation of the human eye has a strong correlation to the reflectance. In view of the Retinex theory, in an image having a wide dynamic range, a reflectance component having a strong correlation to visual sensation of the human eye can be maintained by exclusively reducing the dynamic range of the illumination light component. Thereby, an image having a high contrast and a compressed dynamic range can be obtained. In other words, an image having a compressed dynamic range can be obtained by adjusting the density of a bright portion and a dark portion, while maintaining the gradation of an image portion having an intermediate density.

U.S. Pat. No. 6,807,316, corresponding to Japanese Unexamined Patent Publication No. 2001-298619 (D5) discloses a technique, for compressing the dynamic range of an original image, comprising: generating a low frequency component of an image signal S0 i.e. creating an unsharp image S1 having a moderate change in luminance by subjecting an image signal S0 representing an original image to low-pass filter processing; inverting the value of the unsharp image signal S1 by performing data conversion with respect to the unsharp image signal S1 based on a lookup table; creating a processed image signal S4 whose dynamic range is compressed; and obtaining an image signal S5 by summing up the processed image signal S4 and the image signal S0 representing the original image. In the dynamic range compression technique disclosed in D5, in the case where the dynamic range is unduly compressed, a halo effect may be generated, wherein a pseudo outline in the form of a band having a certain width is generated along a boundary e.g. the outline of a subject image, where the luminance is sharply changed, as shown in a boundary between the subject image and a background image. In view of this, D5 proposes an image processing method, capable of suppressing generation of a pseudo outline, comprising: creating multiple unsharp image signals representing unsharp images of an original image, based on an image signal representing the original image; generating one combined unsharp image signal by combining the multiple unsharp image signals; and subjecting the image signal representing the original image to dynamic range compression based on the combined unsharp image signal. A compression function ftotal ($\alpha$) to be used in the dynamic range compression in the image processing method proposed in D5 is generated by: calculating a total compression ratio $\alpha$ having a profile shown in FIG. 12 to define a compression function f($\alpha$); and correcting the compression function f($\alpha$) with a compression function flight ($\alpha$) with respect to a bright portion and a compression function fdark(α) with respect to a dark portion. The total compression ratio α having the profile shown in FIG. 12 is set to 0, in the case where the dynamic range is smaller than a predetermined threshold value DRth; fixed to a lower limit value αmax, in the case where the dynamic range is larger than the threshold value DRmax (>DRth); and is linearly changed in the case where the dynamic range is not smaller than the threshold value DRth and not larger than the threshold value DRmax.

Japanese Patent No. 3,750,797 (D6) discloses an image processing method, for converting an input image into an image having a relatively small dynamic range, comprising: a smoothing step of performing smoothing processing with respect to each of divided input images to generate smoothed images having different degrees of smoothness; an edge intensity calculating step of calculating an edge intensity based on the smoothed images; a combining step of combining the smoothed images based on the calculated edge intensity; a coefficient calculating step of calculating a coefficient to be used in converting each pixel value of the input images, based on a combined smoothed image generated by combining the multiple smoothed images; and a pixel value converting step of converting each pixel value of the input images based on the calculated coefficients. In the dynamic range compression processing to be used in the image processing method disclosed in D6, dynamic range compression is performed by: calculating a coefficient $C(x,y)=(F(R(x,y)))$, using a coefficient calculation function F(1) having a profile shown in FIG. 13A, based on each pixel value R(x,y) of the combined smoothed image R; and multiplying a pixel value I(x,y) of the input image I by the coefficient C(x,y). The coefficient calculation function F(1) is calculated by performing a computation: F(1)=T(1)/1, using a level conversion function T(1) having a profile shown in FIG. 13B. A minimum value Cmin of the coefficient C is given by a ratio Mmax/Lmax, which is a ratio of the maximum value Mmax of output level to the maximum value Lmax of input level in the level conversion function T(1). Alternatively, a gamma function $T(l)=(1/Lmax)^g \times Lmax$, a LOG function $T(l)=(\log(1)/\log(Lmax)) \times Lmax$, or a histogram equalization method, wherein the level conversion function is adaptively changed depending on a frequency distribution of the pixel level of an input image, may be used, as the level conversion function T(1).

In the dynamic range compression techniques disclosed in D5 and D6, the image quality may be degraded depending on an input image in view of a point that the aforementioned function is used. For instance, in D6, the minimum value Cmin of the coefficient C is determined by the maximum value (Mmax, Lmax) of the level conversion function T(1). Accordingly, in the case where an input image includes one or more pixels having an exceedingly large pixel value, most of the pixels in the input image are outputted as a dark image without compression, which may degrade the image quality.

SUMMARY OF THE INVENTION

In view of the above conventional examples, it is an object of the present invention to provide an image processing device, an image processing method, and an image pickup apparatus that enable to advantageously perform proper dynamic range compression in a simplified manner.

In an image processing device, an image processing method, and an image pickup apparatus according to an aspect of the invention, a compression characteristic is generated based on one of multiple smoothed images to be generated based on an input image, and a compressed base component image having a smaller dynamic range than the dynamic range of a base component image is generated by using the compression characteristic. The image processing device, the image processing method, and the image pickup apparatus enable to more advantageously define a proper compression characteristic, and compress the dynamic range of the input image in a simplified manner and with high quality, as compared with the background art.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
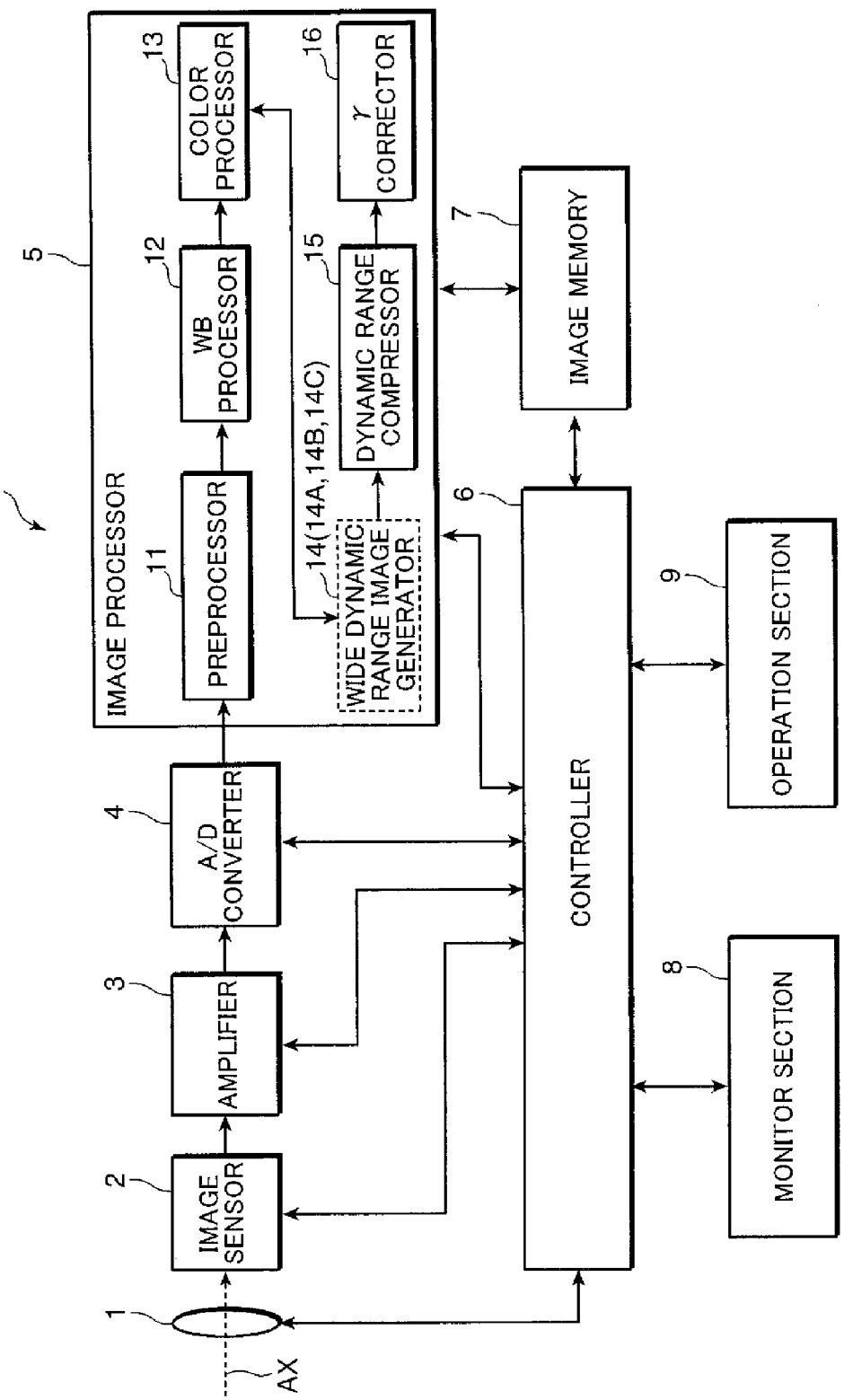
FIG. 1 is a diagram showing an arrangement of an image pickup apparatus incorporated with an image processing device embodying the invention.

In the following, an embodiment of the invention is described referring to the drawings. Throughout the drawings, elements indicated by the same reference numerals have substantially an identical arrangement, and repeated description thereof is omitted herein. Also, in the specification, in the case where the element is generically referred to, the element is indicated by the reference numeral without a suffix; and in the case where the element is individually referred to, the element is indicated by the reference numeral attached with a suffix.

First, an arrangement of an image pickup apparatus incorporated with an image processing device embodying the invention is described. FIG. 1 is a diagram showing an arrangement of the image pickup apparatus incorporated with the image processing device embodying the invention. Referring to FIG. 1, an image pickup apparatus CA adapted as a digital camera or a like device includes a lens section 1, an image sensor 2, an amplifier 3, an A/D converter 4, an image processor 5, a controller 6, an image memory 7, a monitor section 8, and an operation section 9.

The lens section 1 is an optical system which serves as a lens aperture for receiving light from a subject i.e. a light image, and is adapted to guide the light image to the image sensor 2 so as to form the light image on a light receiving surface of the image sensor 2 disposed in the interior of a main body of the image pickup apparatus CA. The lens section 1 includes e.g. a zoom lens, a focus lens, and other fixed lens, which are arranged in series along e.g. the optical axis AX of the light image, and further includes a diaphragm (not shown) and a shutter (not shown) for adjusting the amount of light transmitted through the lens section 1. The zoom lens, the focus lens, the diaphragm, and the shutter are configured in such a manner as to be driven under the control of the controller 6.

The image sensor 2 includes a number of photoelectric conversion elements arranged in such a manner as to form the light receiving surface of the image sensor 2, which is a two-dimensional plane. The image sensor 2 is an element for photoelectrically converting the light image into image signals of respective color components of R (red), G (green), and B (blue) in accordance with the light amount of the light image formed on the light receiving surface of the image sensor 2 through the lens section 1, for outputting the image signals to the amplifier 3 provided posterior to the image sensor 2. The image sensor 2 may be e.g. a CCD image sensor, an MOS image sensor, or a VMIS image sensor.

The amplifier 3 is a circuit for amplifying an image signal outputted from the image sensor 2. The amplifier 3 includes e.g. an AGC (auto gain control) circuit, and controls the gain of the output signal. The amplifier 3 may include a CDS (correlation double sampling) circuit for reducing sampling noise in the image signal as an analog value, in addition to the AGC circuit. The AGC circuit is operable to compensate for insufficiency in luminance level of a picked up image of the subject having an extremely low luminance, in the case where a proper exposure is not obtained. The gain value with respect to the AGC circuit is set by the controller 6.

The A/D converter 4 is a circuit for performing A/D conversion of converting an image signal having an analog value i.e. an analog signal amplified by the amplifier 3 into an image signal having a digital value i.e. a digital signal. The A/D converter 4 converts each pixel signal obtained by receiving light on each pixel of the image sensor 2 into pixel data of e.g. 12 bits.

The image processor 5 is a circuit for performing various image processing with respect to the image signal obtained by the A/D conversion of the A/D converter 4. For instance, the image processor 5 is configured in such a manner that a preprocessor 11 performs pre-processing such as black level correction or fixed pattern noise correction; a white balance corrector i.e. a WB processor 12 performs white balance correction; a color processor 13 performs color processing such as color interpolation, color correction, or color space conversion; a dynamic range compressor 15 performs dynamic range compression; and a gamma corrector or a γ corrector 16 performs gamma correction. As described above, preferably, the dynamic range compressor 15 may be provided in the image processor 5 so that dynamic range compression is performed with respect to a picked-up image after various adjustments on luminance or color. The pre-processing, the white balance correction, the color processing, and the gamma correction are performed by a well-known processing method.

The image memory 7 is a circuit for saving i.e. storing data such as RAW data to be used before image processing by the image processor 5 is performed, and image data to be used during or after various processing by the image processor 5 or the controller 6. The image memory 7 includes a memory such as an EEPROM (Electrically Erasable Programmable Read Only Memory), which is a non-volatile rewritable storing element, and an RAM (Random Access memory), which is a volatile storing element.

The monitor section 8 is a device for displaying an image picked up by the image sensor 2, i.e. an image processed by the image processor 5, an image stored in the image memory 7, or the like. The monitor section 8 includes a color liquid crystal display (LCD) provided in e.g. the main body of the image pickup apparatus CA.

The operation section 9 is a device for allowing a user to input an operation command for the image pickup apparatus CA. The operation section 9 includes operation switches i.e. operation buttons such as a power source switch, a release switch, a mode setting switch for setting various image shooting modes, and a menu selecting switch. For instance, when the release switch is depressed i.e. turned on, an image sensing operation i.e. a series of still image/moving image shooting operations comprising: picking up a light image by the image sensor 2 through the lens section 1; applying predetermined image processing to the image acquired by the image pickup operation; and recording the processed image into the image memory 7 or a like device is executed.

The controller 6 is a circuit for controlling overall operations of the image pickup apparatus CA by controlling the individual parts in accordance with the function thereof. The controller 6 calculates a control parameter required in the individual parts e.g. an exposure amount control parameter for setting an optimum exposure amount in an image shooting operation, based on various signals from the individual parts such as the image sensor 2 or the operation section 9; and controls the operations of the individual parts by outputting the control parameter to the individual parts. For instance, the controller 6 controls the lens section 1 or the image sensor 2 to perform an image pickup operation based on the control parameter; controls the image processor 5 to perform image processing; and controls the monitor section 8 to display image data or the like to be stored in the image memory 7. The controller 6 includes e.g. an ROM (Read Only Memory), as a non-volatile storing element, for storing various programs or the like, an RAM for temporarily storing various data, and a central processing unit (CPU) for reading out the control program or the like from the ROM for execution.

Figure 2:
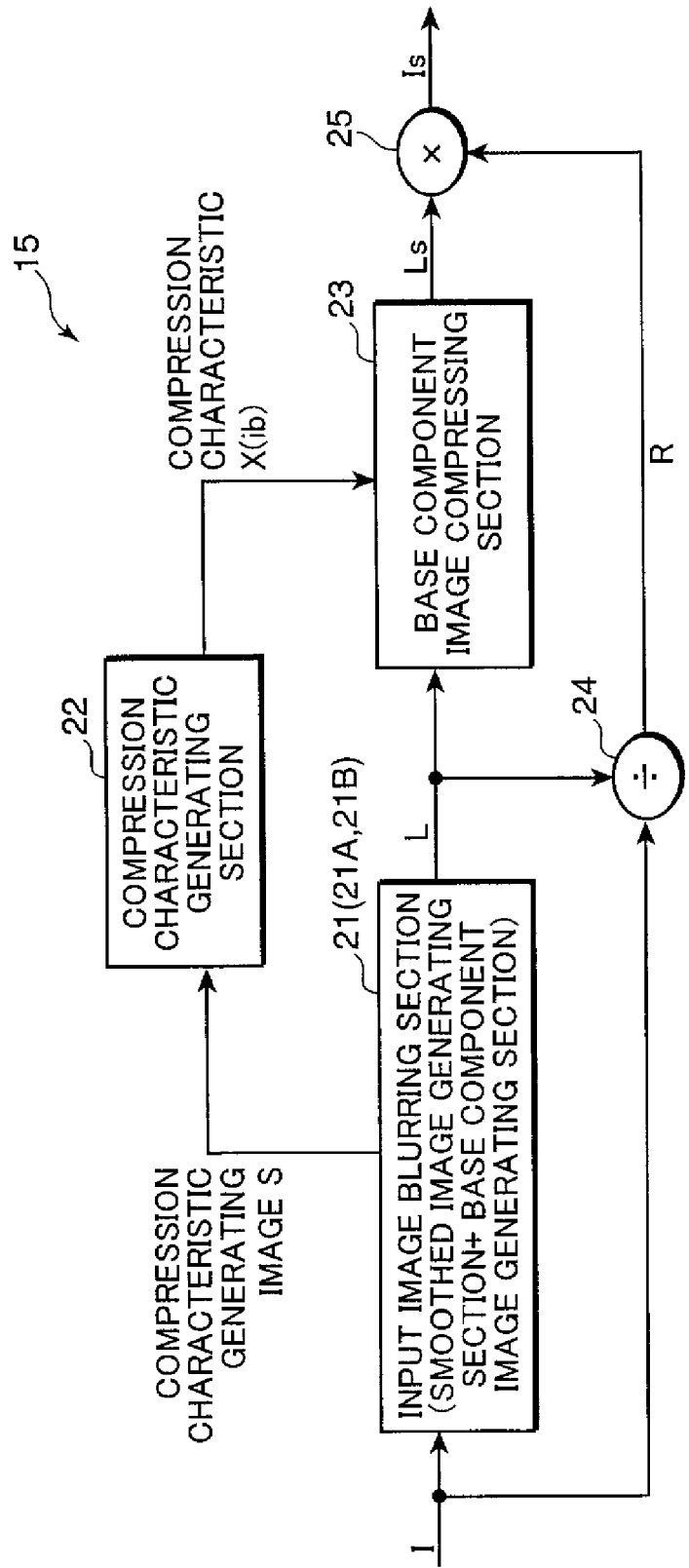
FIG. 2 is a diagram showing an arrangement of a dynamic range compressor in the image pickup apparatus.
Figure 3:
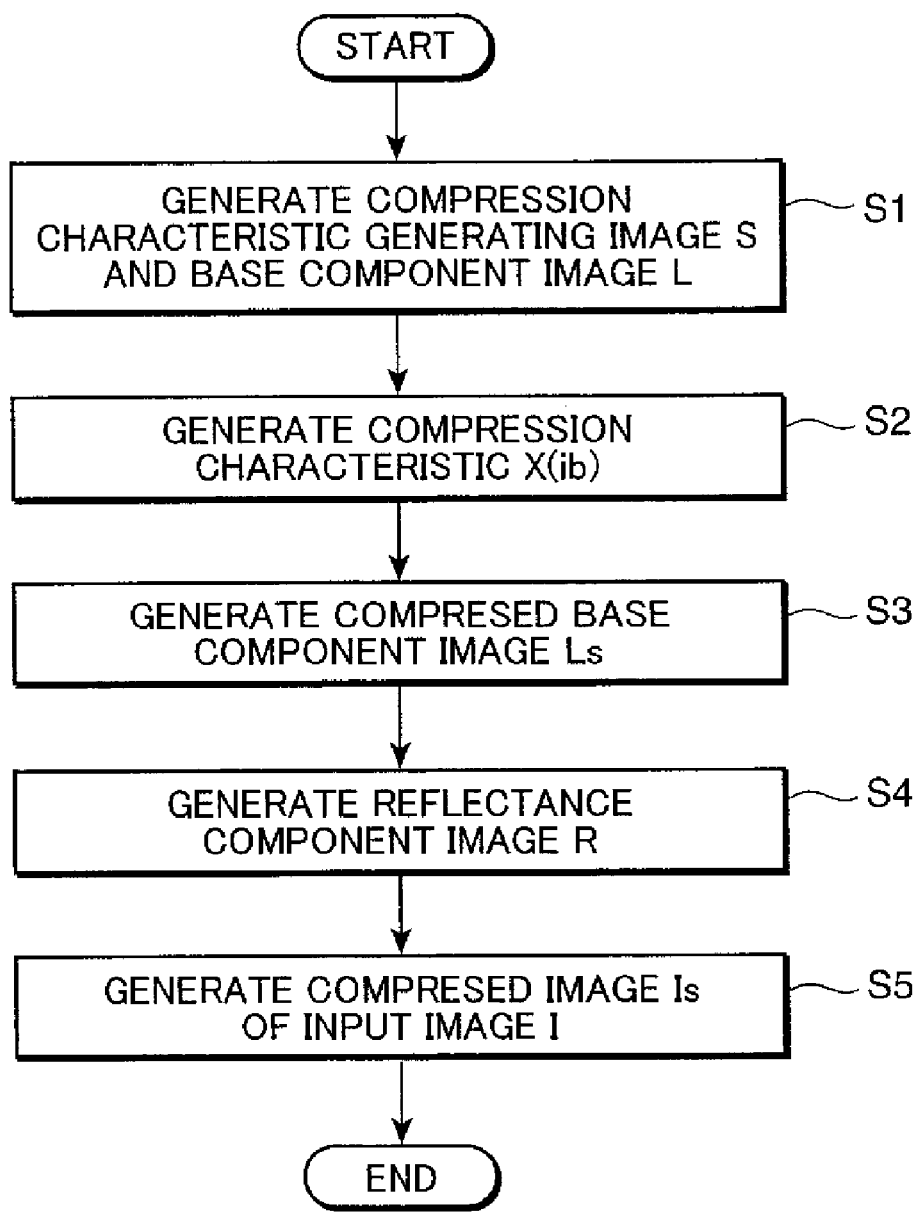
FIG. 3 is a flowchart showing an operation to be performed by the dynamic range compressor in the image pickup apparatus.

In the following, an arrangement of the dynamic range compressor 15 is described. FIG. 2 is a diagram showing an arrangement of the dynamic range compressor in the embodiment FIG. 3 is a flowchart showing an operation to be performed by the dynamic range compressor in the embodiment.

Referring to FIG. 2, the dynamic range compressor 15 is adapted to compress the dynamic range of an input image I based on the aforementioned Retinex theory. The dynamic range compressor 15 includes an input image blurring section 21, a compression characteristic generating section 22, a base component image compressing section 23, a dividing section 24, and a combining section 25.

The input image blurring section 21 generates multiple smoothed images having space frequency components different from each other, and resolutions i.e. data sizes or pixel numbers different from each other by differentiating cutoff frequencies, based on the input image I; and generates a base component image L whose resolution is equal to the resolution of the input image I, based on the multiple smoothed images. The base component image L is a smoothed image whose luminance is moderately changed, and corresponds to an image of an illumination light component in the Retinex theory. In this embodiment, the input image blurring section 21 is constituted of a smoothed image generating section and a base component image generating section. The smoothed image generating section generates multiple smoothed images based on the input image I. The base component image generating section generates a base component image L based on the multiple smoothed images.

The compression characteristic generating section 22 generates a compression characteristic X(ib) for use in compressing the base component image L based on a compression characteristic generating image S, wherein one of the smoothed images to be generated during processing by the image input blurring section 21 is defined as the compression characteristic generating image S. The compression characteristic X(ib) is a graph indicating a correlation between a pixel value (ib) before compression and a pixel value (ia) after compression in compressing the dynamic range of the input image I. The compression characteristic X(ib) is expressed by a function formula to be described later. Alternatively, the compression characteristic X(ib) may be expressed by a lookup table or a like indication.

The base component image compressing section 23 generates a compressed base component image Ls whose dynamic range is smaller than the dynamic range of the base component image L by applying the compression characteristic X(ib) generated in the compression characteristic generating section 22 to the base component image L generated in the input image blurring section 21.

The dividing section 24 generates a reflectance component image R by dividing the input image I by the base component image L generated in the base component image generating section 21. The reflectance component image R is an image of a high frequency component in the input image I, which is obtained by removing the base component image from the input image I, and corresponds to an image of a reflectance component of an object in the Retinex theory.

The combining section 25 combines the compressed base component image Ls generated in the base component image compressing section 23, and the reflectance component image R generated in the dividing section 24.

In the dynamic range compressor 15 having the above arrangement, the input image I is inputted to the input image blurring section 21 and the dividing section 24. The input image blurring section 21 is operable to generate multiple smoothed images based on the input image I (corresponding to a smoothed image generating step), and generate the base component image L of the input image I by using the multiple smoothed images (corresponding to a base component image generating step), whereby the base component image L is inputted to the base component image compressing section 23 and the dividing section 24. Also, in the input image blurring section 21, one of the smoothed images to be generated, as an intermediate product, during generation of the base component image L based on the input image I, is defined as the compression characteristic generating image S. The compression characteristic generating image S is inputted to the compression characteristic generating section 22.

The compression characteristic generating section 22 is operable to generate the compression characteristic X(ib) based on the inputted compression characteristic generating image S (corresponding to a compression characteristic generating step). The compression characteristic X (ib) is inputted to the base component image compressing section 23. The base component image compressing section 23 is operable to compress the base component image L inputted from the base component image generating section 21 by using the compression characteristic X(ib) inputted from the compression characteristic generating section 22 to generate the compressed base component image Ls, in which the base component image L of the input image I is compressed (corresponding to a base component image compressing step). In other words, the base component image compressing section 23 converts the pixel value (ib) of the pixel of the base component image L into the pixel value (ia) by executing the function X(ib) (=ia), whereby the pixel value (ia) of the pixel of the compressed base component image Ls is defined. The compressed base component image Ls is outputted from the base component image compressing section 23 to the combining section 25. On the other hand, the dividing section 24 is operable to divide the input image I by the base component image L inputted from the base component image generating section 21 to generate the reflectance component image R. The reflectance component image R is outputted from the dividing section 24 to the combining section 25. The combining section 25 combines i.e. sums up the compressed base component image Ls inputted from the base component image compressing section 23, and the reflectance component image R inputted from the dividing section 24 to generate a compressed image Is, in which the dynamic range of the input image I is compressed (corresponding to a compressed image generating step).

As shown in FIG. 3, the dynamic range compressor 15 having the above arrangement is operated as follows. First, the base component image L is generated based on the input image I, and the compression characteristic generating image S is generated in generating the base component image L (in Step S1 corresponding to the smoothed image generating step and the base component image generating step). Then, the compression characteristic X(ib) is generated based on the compression characteristic generating image S (in Step S2 corresponding to the compression characteristic generating step). Then, the compressed base component image Ls is generated by applying the compression characteristic X(ib) generated in Step S2 to the base component image L (in Step S3 corresponding to the base component image compressing step). Then, the reflectance component image R is generated by dividing the input image I by the base component image L (in Step S4). Then, the compressed image Is of the input image I is generated by combining the compressed base component image Ls and the reflectance component image R (in Step S5 corresponding to the compressed image generating step). In this embodiment, Steps S through S3, and Step S4 may be executed before Step S5 is executed, or may be simultaneously executed, or sequentially executed.

Figure 4:
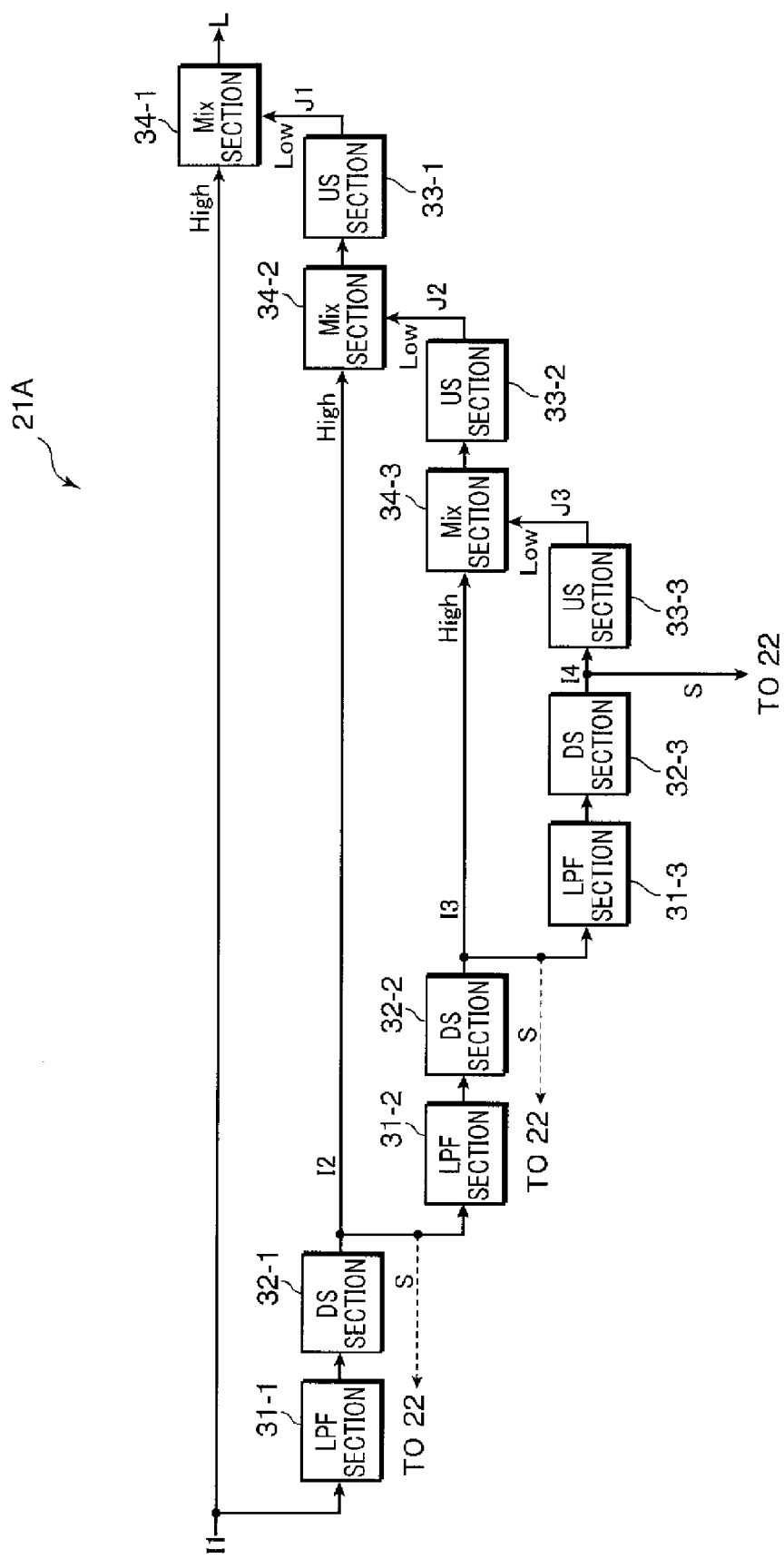
FIG. 4 is a diagram showing an arrangement of an input image blurring section of three-stage arrangement in the image pickup apparatus.
Figure 5A:
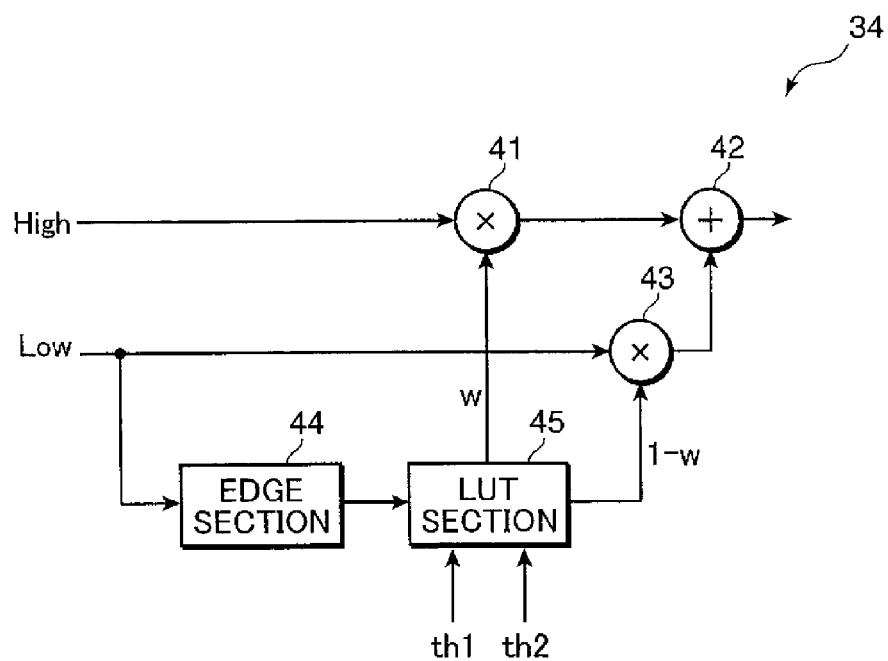
FIGS. 5A and 5B are diagrams showing an arrangement of a blurred image combining section in the input image blurring section.
Figure 5B:
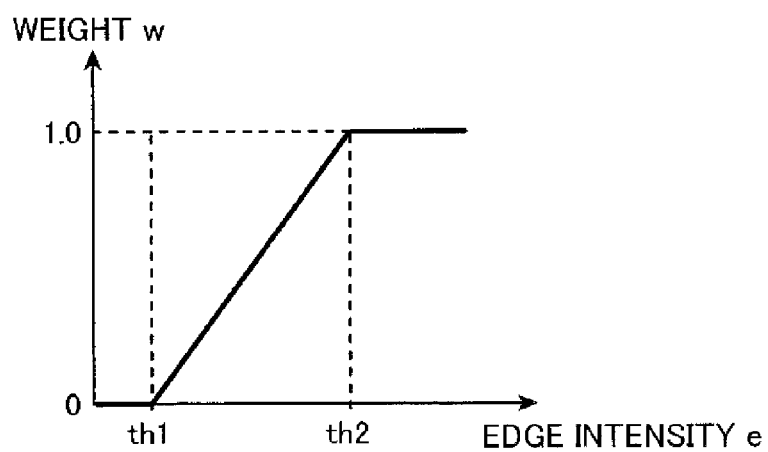

In the following, the arrangement of the input image blurring section 21 is described. FIG. 4 is a diagram showing an arrangement of an input image blurring section having a three-stage arrangement in the image pickup apparatus embodying the invention. FIGS. 5A and 5B are diagrams showing an arrangement of a blurred image combining section in the input image blurring section in the embodiment.

An input image blurring section 21A shown in FIG. 4 is an example of the input image blurring section 21 in the dynamic range compressor 15. The input image blurring section 21A includes a low-pass filter section (LPF section) 31 for generating a low space frequency image constituted of a space frequency component whose frequency is lower than a predetermined cutoff frequency, by performing low-pass filter processing at the cutoff frequency; and a downsampling section (DS) 32 for downsampling the low space frequency image at a predetermined first rate to generate a low resolution image whose resolution is smaller than the resolution of the input image I. The input image blurring section 21A is operable to generate multiple blurred images having space frequency components different from each other and resolutions different from each other based on the input image I, by repeating the low-pass filter processing by the LPF section 31 and the downsampling processing by the DS section 32 with respect to the input image I a predetermined number of times (n) (in the example of FIG. 4, three times). The input image blurring section 21A further includes an upsampling section (US section) 33 for upsampling one of the blurred images at a second rate depending on the first rate to generate an upsampled resolution image; and a blurred image combining section (Mix section) 34 for combining the upsampled resolution image obtained by the upsampling processing of the US section 33, and a blurred image whose resolution is equal to the resolution of the upsampled resolution image to generate a combined blurred image. The input image blurring section 21A is operable to generate a base component image L by repeating the upsampling processing by the US section 33 and the combining processing by the Mix section 34 with respect to the multiple blurred images the predetermined number of times (n) (in the example of FIG. 4, three times). The base component image L is a combined blurred image obtained by performing final-stage combining processing.

As described above, subjecting the input image I to low-pass filter processing stage by stage enables to utilize a low-pass filter of a smaller filter size, as compared with a case that the input image I is subjected to low-pass filter processing in a single stage. This is advantageous in configuring the input image blurring section 21 in a simplified manner, and reducing the computation amount if a digital filter is used as the low-pass filter.

In the input image blurring section 21A having the above arrangement, the LPF section 31 and the DS section 32 are provided. The arrangement of generating multiple blurred images having different space frequency components i.e. different degrees of smoothness or different degrees of blur, and having different resolutions from each other based on the input image I by repeating the low-pass filter processing by the LPF section 31 and the downsampling processing by the DS section 32 with respect to the input image I the predetermined number of times (n) corresponds to a smoothed image generating section. The smoothed images correspond to the blurred images, and one of the blurred images corresponds to the compression characteristic generating image S.

As described above, in the embodiment, multiple smoothed images i.e. blurred images having space frequency components different from each other and resolutions different from each other are generated based on the input image by differentiating the cutoff frequencies. One of the smoothed images is selected as the compression characteristic generating image S. The selected compression characteristic generating image S is outputted from the input image blurring section 21A to the compression characteristic generating section 22. Thereby, a proper compression characteristic can be advantageously generated.

For instance, as shown in FIG. 4, the three-stage input image blurring section 21A includes, depending on the number of stages, three LPF sections 31-1, 31-2, and 31-3; three DS sections 32-1, 32-2, and 32-3; three US sections 33-1, 33-2, and 33-3; and three Mix sections 34-1, 34-2, and 34-3. The input image blurring section 21A is configured in such a manner that each one of the LPF section 31, each one of the DS section 32, each one of the US section 33, and each one of the Mix section 34 constitute a one-stage arrangement, wherein the output from the upper-stage DS section 32 is defined as the input image I in the lower stage arrangement, and the output from the lower-stage Mix section 34 is defined as the input to the upper-stage US section 33, with a lower stage arrangement is provided between the upper-stage DS section 32 and the upper-stage US section 33.

The input image I (=I1) is inputted to the LPF section 31-1 and the Mix section 34-1. The LPF section 31-1 may be a two-dimensional digital filter of a filter size e.g. tap number 7. By subjecting the input image I1 to low-pass filter processing, a first low space frequency image is generated. The first low space frequency image is inputted to the DS section 32-1. The DS section 32-1 downsamples the first low space frequency image by reducing the number of pixels of the first low space frequency image both in vertical and horizontal directions by e.g. one-half by e.g. pixel interpolation to generate a first low resolution image i.e. a first blurred image or a first smoothed image I2. The first blurred image I2 is inputted to the LPF section 31-2 and the Mix section 34-2, as a lower-stage input image I. In this embodiment, the first rate is set to ½.

Similarly to the LPF section 31-1, the LPF section 31-2 generates a second low space frequency image constituted of a space frequency component whose frequency is lower than the frequency of the first low space frequency image i.e. a more smoothed image or a more blurred image by subjecting the first blurred image I2 to low-pass filter processing. The second low space frequency image is inputted to the DS section 32-2. Similarly to the DS section 32-1, the DS section 32-2 generates a second low resolution image whose resolution is smaller than the resolution of the first low resolution image i.e. an image with a smaller data size or a smaller pixel number by downsampling the second low space frequency image. In other words, a second blurred image or a second smoothed image I3 is generated. The second blurred image I3 is inputted to the LPF section 31-3 and the Mix section 34-3, as a lower-stage input image I.

Similarly to the LPF section 31-1, the LPF section 31-3 generates a third low space frequency image constituted of a space frequency component whose frequency is lower than the frequency of the second low space frequency image i.e. a more smoothed image or a more blurred image by subjecting the third blurred image I3 to low-pass filter processing to input the third low space frequency image to the DS section 32-3. Similarly to the DS section 32-1, the DS section 32-3 generates a third low resolution image whose resolution is smaller than the resolution of the second low resolution image i.e. an image with a smaller data size or a smaller pixel number by downsampling the third low space frequency image. In other words, a third blurred image or a third smoothed image I4 is generated. In the lowermost stage, since there is no further lower-stage Mix section 34, the third blurred image I4 is inputted to the lowermost-stage US section 33-3.

In the input image blurring section 21A shown in FIG. 4, the third blurred image i.e. the third smoothed image I4 serves as the compression characteristic generating image S, and the third blurred image I4 is outputted from the DS section 32-3 to the compression characteristic generating section 22 shown in FIG. 2. Alternatively, as shown by the broken line in FIG. 4, for instance, the first blurred image i.e. the first smoothed image I2 may be outputted from the DS section 32-1 to the compression characteristic generating section 22 shown in FIG. 2, as the compression characteristic generating image S. Further alternatively, the second blurred image i.e. the second smoothed image I3 may be outputted from the DS section 32-2 to the compression characteristic generating section 22 shown in FIG. 2, as the compression characteristic generating image S. In the case where one of the first through the third blurred images or the first through the third smoothed images I2 through I4 is selected as the compression characteristic generating image S, one of the first through the third blurred images I2 through I4 may be selected as the compression characteristic generating image S, based on the space frequencies of the first through the third blurred images I2 through I4. The above arrangement enables to generate a compression characteristic based on a proper compression characteristic generating image S. This is further advantageous in generating a proper compression characteristic. For instance, a blurred image having a highest space frequency among the first through the third blurred images I2 through I4 may be selected as the compression characteristic generating image S. In this arrangement, for instance, the dynamic range compressor 15 may be further provided with a blurred image selecting section for receiving the first through the third blurred images I2 through I4 from the respective DS sections 32-1 through 32-3, calculating a space frequency of each of the first through the third blurred images I2 through I4, and outputting a blurred image having a highest space frequency to the compression characteristic generating section 22.

Then, the US section 33-3 sets the second rate to 2 depending on the first rate to be used in the DS section 32 so that the resolution of the second blurred image I3 in the upper-stage arrangement coincides with the resolution of a third upsampled resolution image J3 to be described later; upsamples the third blurred image I4 by performing e.g. pixel interpolation such as linear pixel interpolation of doubling the pixel number of the third blurred image I4 both in horizontal and vertical directions to generate the third upsampled resolution image J3. The third upsampled resolution image J3 is inputted to the Mix section 34-3. The Mix section 34-3 combines i.e. sums up the third upsampled resolution image J3 inputted from the US section 33-3, and the second blurred image I3 which has been inputted from the upper-stage DS section 32-2, and whose resolution is equal to the resolution of the third upsampled resolution image J3 to generate a third combined blurred image. The third combined blurred image is inputted to the upper-stage US section 33-2.

Similarly to the US section 33-3, the US section 33-2 upsamples the third combined blurred image to generate a second upsampled resolution image J2. The second upsampled resolution image J2 is inputted to the Mix section 34-2. Similarly to the Mix section 34-3, the Mix section 34-2 combines i.e. sums up the second upsampled resolution image J2 and the first blurred image I2 to generate a second combined blurred image. The second combined blurred image is inputted to the upper-stage US section 33-1.

Similarly to the US section 33-3, the US section 33-2 upsamples the second combined blurred image to generate a first upsampled resolution image J1. The first upsampled resolution image J1 is inputted to the Mix section 34-1. Similarly to the Mix section 34-3, the Mix section 34-1 combines i.e. sums up the first upsampled resolution image J1 and the input image I (=I1) to generate a first combined blurred image. The first combined blurred image corresponds to the base component image L.

The input image blurring section 21A having the above arrangement and operation generates a base component image L after generating multiple blurred images i.e. smoothed images based on the input image I.

The blurred image combining section i.e. the Mix section 34 in the input image blurring section 21 in the embodiment has the following arrangement and operation.

FIGS. 5A and 5B are diagrams for describing the blurred image combining section in the input image blurring section in the embodiment. FIG. 5A is a diagram showing an arrangement of the blurred image combining section, and FIG. 5B is a diagram showing a weighting function representing a correlation between edge intensity (e) and weight (w). In FIG. 5B, the axis of abscissa indicates the edge intensity (e), and the axis of ordinate indicates the weight (w).

Referring to FIG. 5A, the Mix section 34 includes a first multiplier 41, an adder 42, a second multiplier 43, an edge section 44, and a lookup table section (LUT section) 45.

The edge section 44 receives an upsampled resolution image Jn from the instant-stage US section 33 to obtain the edge intensity (e) of the upsampled resolution image Jn. The obtained edge intensity (e) is outputted to the LUT section 45. The edge intensity (e) is obtained by e.g. an edge extraction filter such as a Sobel filter or a Prewitt filter.

The LUT section 45 calculates weights (w) and (1−w) to be respectively applied to a blurred image (In−1) which has been inputted from the preceding-stage DS section 32 and is to be combined in the instant-stage Mix section 34, and the upsampled resolution image Jn to be inputted from the instant-stage US section 33, based on the edge intensity (e) inputted from the edge section 44; and outputs the calculated weights (w) and (1−w) to the first multiplier 41 and the second multiplier 43, respectively.

The weight (w) is determined as follows. As shown in FIG. 5B, in the case where the edge intensity (e) is not smaller than 0 and not larger than a predetermined first edge preservation threshold value th1, the weight (w) is set to 0. In the case where the edge intensity (e) is not smaller than a predetermined second edge preservation threshold value th2, the weight (w) is set to 1. In the case where the edge intensity (e) is not smaller than the first edge preservation threshold value th1 and not larger than the second edge preservation threshold value th2, the weight (w) is set to (e−th1)/(th2−th1).

Referring back to FIG. 5A, the first multiplier 41 multiplies the blurred image (In−1) inputted from the preceding-stage DS section 32 by the weight (w) inputted from the LUT section 45, and outputs the blurred image (In−1) weighted with the weight (w) to the adder 42.

The second multiplier 43 multiplies the upsampled resolution image Jn inputted from the instant-stage US section 33 by the weight (1−w) inputted from the LUT section 45, and outputs the upsampled resolution image Jn weighted with the weight (1−w) to the adder 42.

The adder 42 sums up the blurred image (In−1) weighted with the weight (w), which has been inputted from the first multiplier 41, and the upsampled resolution image Jn weighted with the weigh (1−w), which has been inputted from the second multiplier 43 to generate a combined blurred image, and outputs the combined blurred image to the preceding-stage US section 33.

In the Mix section 34 having the above arrangement, the edge intensity (e) of the upsampled resolution image Jn generated in the instant-stage US section 33 is calculated by the edge section 44, and the weights (w) and (1−w) are calculated by the LUT section 45 based on the edge intensity (e). Then, the blurred image (In−1) inputted from the preceding-stage DS section 32 is weighted with the weight (w) by the first multiplier 41, and the upsampled resolution image Jn inputted from the instant-stage US section 33 is weighted with the weight (1−w) by the second multiplier 43. Then, the blurred image (In−1) weighted with the weight (w), and the upsampled resolution image Jn weighted with the weight (1−w) are summed up by the adder 42 to generate a combined blurred image.

The first edge preservation threshold value th1 and the second edge preservation threshold value th2 are values for controlling a mixing ratio of the blurred image (In−1) inputted from the preceding-stage DS section 32, and the upsampled resolution image Jn inputted from the instant-stage US section 33. The first edge preservation threshold value th1 may be an identical value or a different value among the stages. Likewise, the second edge preservation threshold value th2 may be an identical value or a different value among the stages.

In the Mix section 34 having the above arrangement and operation, an edge component of the base component image L contains a significantly large amount of information relating to an edge portion of the input image I, and therefore, the edge portion is advantageously preserved.

In FIG. 4, the three-stage input image blurring section 21A is described. Alternatively, the input image blurring section 21A may have an arrangement other than the three-stage arrangement, such as a one-stage arrangement, a two-stage arrangement, or four or more stage arrangement. In the embodiment, the first rate is set to ½. Alternatively, the first rate may be any rate other than ½ such as ⅓ or ¼. As described above, the second rate is defined depending on the first rate. For instance, in the case where the first rate is ⅓, the second rate is 3. In the case where the first rate is ¼, the second rate is 4.

Figure 6:
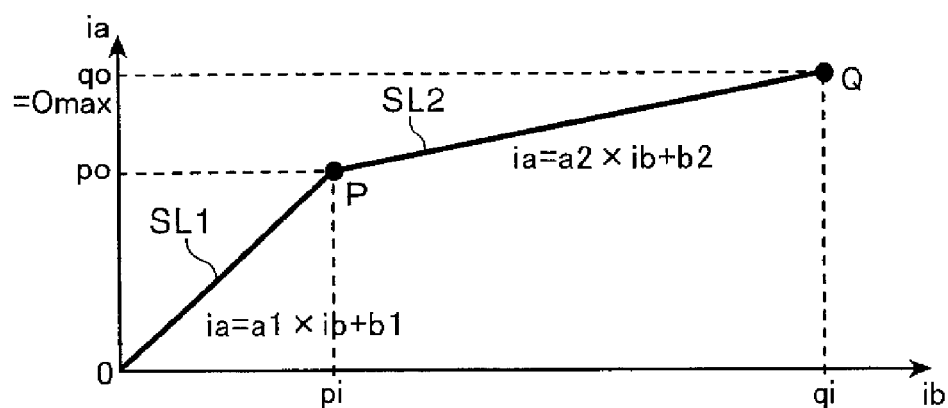
FIG. 6 is a diagram showing an example of a compression characteristic to be used in the dynamic range compressor.

In the following, the compression characteristic generating section 22 is described. FIG. 6 is a diagram showing an example of a compression characteristic to be used in the dynamic range compressor in the embodiment. In FIG. 6, the axis of abscissas indicates the pixel value (ib) before compression i.e. the pixel value (ib) of the base component image L, and the axis of ordinate indicates the pixel value (ia) after compression i.e. the pixel value (ia) of the compressed base component image Ls.

The compression characteristic X(ib) in the embodiment is defined by two consecutive straight lines i.e. a first straight line SL1 and a second straight line SL2, and is uniquely determined based on the coordinate values of terminal points O and Q, and the coordinate value of a continuous point i.e. a connecting point P between the first straight line SL1 and the second straight line SL2. Assuming that the gradients of the first straight line SL1 and the second straight line SL2 are (a1) and (a2), and the intercepts thereof are (b1) and (b2), respectively, the first straight line SL1 is expressed by: ia=a1×ib+b1, and the second straight line SL2 is expressed by: ia=a2×ib+b2.

Since the compression characteristic X(ib) is uniquely determined based on the coordinate values of the terminal points O and Q, and the coordinate value of the continuous point P, the compression characteristic generating section 22 generates the compression characteristic X(ib) by defining the coordinate values of the three points O, P and Q. In defining the coordinate values of the points O, P, and Q, the compression characteristic generating section 22 defines the coordinate value of at least one of the three points O, P, and Q, based on the compression characteristic generating image S inputted from the input image blurring section 21.

The coordinate value of the terminal point O of the compression characteristic X(ib) is set to e.g. the coordinate origin (0,0), as shown in FIG. 6, and fixed thereat i.e. b1=0. The terminal point O may be set to a point (0,b1) on the axis (ia) where b1≠0, and fixed thereat.

Concerning the coordinate value (qi,qo) of the terminal point Q of the compression characteristic X(ib), the value (qi) is set to e.g. the maximum pixel value Smax of the compression characteristic generating image S i.e. qi=Smax. Also, the value (qi) is set to e.g. a constant multiplication of the minimum pixel value Smin of the compression characteristic generating image S i.e. qi=Smin×k1 where k1 is a constant. Also, the value (qi) is set to a sum of an average value Save of the pixel value in the compression characteristic generating image S, and a constant multiplication of a standard deviation Sσ of the pixel value in the compression characteristic generating image S i.e. qi=Save+Sσ×k2 where k2 is a constant. The value (qo) is set to a maximum value of the pixel value in the dynamic range after compression.

Concerning the pixel value (pi,po) of the continuous point i.e. the connecting point P of the compression characteristic X(ib), the values (pi) and (po) are respectively set to such a value that the dark portion before compression has a proper brightness after compression, and fixed thereat. Also, the value (po) is set to such a value that the dark portion before compression has a proper brightness after compression, and fixed thereat. Likewise, the value (pi) is set to a value corresponding to a difference between the average value Save of the pixel value in the compression characteristic generating image S, and the constant multiplication of the standard deviation Sσ of the pixel value in the compression characteristic generating image S i.e. pi=Save−Sσ×k3 where k3 is a constant.

The gradient (a1) and the intercept (b1) of the first straight line SL1 are calculated by assigning the coordinate value of the point O and the coordinate value of the point P to the equation: ia=a1×ib+b1, and solving the simultaneous equations on (a1) and (b1). Likewise, the gradient (a2) and the intercept (b2) of the second straight line SL2 are calculated by assigning the coordinate value of the point P and the coordinate value of the point Q to the equation: ia=a2×ib+b2, and solving the simultaneous equations on (a2) and (b2).

As described above, the compression characteristic generating section 22 generates the compression characteristic X(ib) by using the maximum value Smax or the minimum value Smin of the pixel value in the compression characteristic generating image S; or generates the compression characteristic X(ib) by using the average value Save of the pixel value in the compression characteristic generating image S, and a degree of variation i.e. the standard deviation Sσ in this embodiment. Alternatively, dispersion of the pixel value in the compression characteristic generating image S may be used in place of the standard deviation Sσ.

As described above, the compression characteristic generating section 22 generates the compression characteristic X(ib) by using a generally used value such as a maximum value, a minimum value, an average value, or a standard deviation. This enables to configure the compression characteristic generating section 22 in a simplified manner, and generate a proper compression characteristic X(ib).

Figure 7:
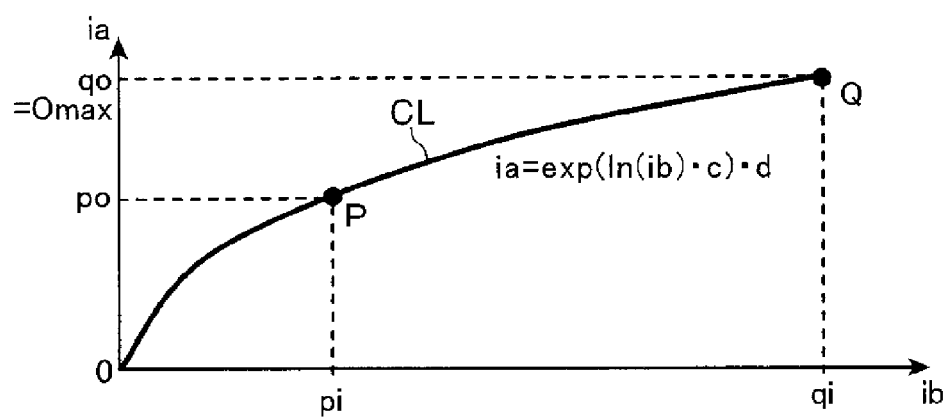
FIG. 7 is a diagram showing another example of the compression characteristic to be used in the dynamic range compressor.

Alternatively, the compression characteristic generating section 22 may generate the compression characteristic X(ib) in the following manner. FIG. 7 is a diagram showing another example of the compression characteristic to be used in the dynamic range compressor in the embodiment. In FIG. 7, the axis of abscissas indicates the pixel value (ib) before compression i.e. the pixel value (ib) of the base component image L, and the axis of ordinate indicates the pixel value (ia) after compression i.e. the pixel value (ia) of the compressed base component image Ls.

The another example of the compression characteristic X(ib) shown in FIG. 7 in this embodiment is expressed by a curve e.g. a logarithmic curve CL, and is uniquely determined by the coordinate values of the terminal points O and Q, and the coordinate value of a point P between the terminal points O and Q. The logarithmic curve CL is expressed by e.g. an equation: $ia = \exp(\ln(ib) \times c) \times d$ where c and d are each a constant.

Since the compression characteristic X(ib) is uniquely determined by the coordinate values of the terminal points O and Q, and the coordinate value of the mid point P, the compression characteristic generating section 22 generates the compression characteristic X(ib) by defining the coordinate values of the points O, P, and Q. In defining the coordinate values of the points O, P, and Q, the compression characteristic generating section 22 defines the coordinate value of at lest one of the three points O, P, and Q based on the compression characteristic generating image S inputted from the input image blurring section 21.

The coordinate value of the terminal point O of the compression characteristic X(ib) is set to e.g. the coordinate origin (0,0), as shown in FIG. 7. The terminal point O may be set to a point on the axis (ia), and fixed thereat.

Concerning the coordinate value (qi,qo) of the terminal point Q of the compression characteristic X(ib), the value (qi) is set to e.g. the maximum pixel value Smax of the compression characteristic generating image S i.e. qi=Smax. Also, the value (qi) is set to e.g. a constant multiplication of the minimum pixel value Smin of the compression characteristic generating image S i.e. qi=Smin×k4 where k4 is a constant. Also, the value (qi) is set to e.g. a sum of the average value Save of the pixel value in the compression characteristic image S, and a constant multiplication of the standard deviation Sσ of the pixel value in the compression characteristic generating image S i.e. qi=Save+Sσ×k5 where k5 is a constant. The value (qo) is set to a maximum value of the pixel value in the dynamic range after compression.

Concerning the pixel value (pi,po) of the continuous point i.e. the connecting point P of the compression characteristic X(ib), the values (pi) and (po) are respectively set to such a value that the dark portion before compression has a proper brightness after compression, and fixed thereat. Also, the value (po) is set to such a value that the dark portion before compression has a proper brightness after compression, and fixed thereat; and the value (pi) is set to a value corresponding to a difference between the average value Save of the pixel value in the compression characteristic generating image S, and the constant multiplication of the standard deviation Sσ of the pixel value in the compression characteristic generating image S i.e. pi=Save−Sσ×k6 where k6 is a constant. Also, the value (po) is set to such a value that the dark portion before compression has a proper brightness after compression, and fixed thereat, and the value (pi) is set to the constant multiplication of the minimum value Smin of the pixel value in the compression characteristic generating image S i.e. pi=Smin× k7 where k7 is a constant.

The constants (c) and (d) of the logarithmic curve CL are calculated by assigning the coordinate value of the point P and the coordinate value of the point Q to the equation: $ia=\exp(\ln(ib) \times c) \times d$, and solving the simultaneous equations on (c) and (d).

As described above, the compression characteristic generating section 22 generates the compression characteristic X(ib) by using the maximum value Smax or the minimum value Smin of the pixel value in the compression characteristic generating image S; or generates the compression characteristic X(ib) by using the average value Save of the pixel value in the compression characteristic generating image S, and a degree of variation i.e. the standard deviation Sσ in this embodiment. Alternatively, dispersion of the pixel value in the compression characteristic generating image S may be used in place of the standard deviation Sσ.

As described above, the compression characteristic generating section 22 generates the compression characteristic X(ib) by using a generally used value such as a maximum value, a minimum value, an average value, or a standard deviation. This enables to configure the compression characteristic generating section 22 in a simplified manner, and generate a proper compression characteristic X(ib).

Figure 8A:
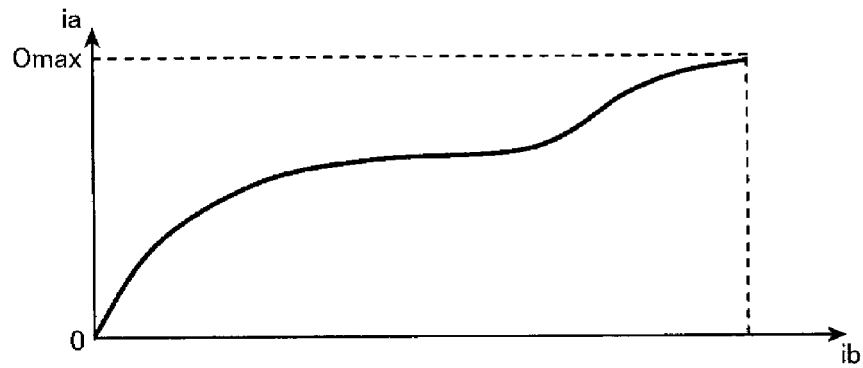
FIGS. 8A and 8B are diagrams for describing another example of the compression characteristic to be used in the dynamic range compressor.
Figure 8B:
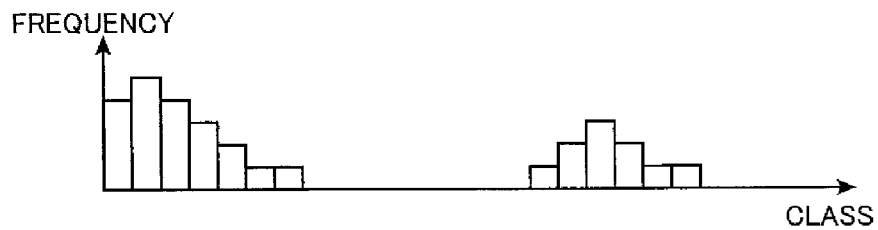

Alternatively, the compression characteristic generating section 22 may generate the compression characteristic X(ib) in the following manner. FIGS. 8A and 8B are diagrams for describing another example of the compression characteristic to be used in the dynamic range compressor in the embodiment. FIG. 8A shows the compression characteristic X(ib), wherein the axis of abscissas indicates the pixel value (ib) before compression i.e. the pixel value (ib) of the base component image L, and the axis of ordinate indicates the pixel value (ia) after compression i.e. the pixel value (ia) of the compressed base component image Ls. FIG. 8B is a histogram i.e. a frequency distribution diagram of the compression characteristic generating image S, wherein the axis of abscissas indicates the class of the pixel value (ib), and the axis of ordinate indicates the frequency of the pixel value (ib).

The another example of the compression characteristic X(ib) shown in FIGS. 8A and 8B in this embodiment is generated by using the histogram of the pixel value in the compression characteristic generating image S. For instance, the compression characteristic X(ib) is obtained by a histogram equalization method based on the compression characteristic generating image S. Briefly describing the histogram equalization method, a histogram of the compression characteristic generating image S is obtained, a cumulative frequency distribution is obtained based on the histogram of the compression characteristic generating image S, and the axis of ordinate representing the cumulative frequency distribution is normalized to a range of a predetermined allowable pixel value after compression. For instance, in the case where the histogram of the compression characteristic generating image S has a distribution as shown in FIG. 8B, the compression characteristic X(ib) becomes a curve as shown in FIG. 8A. In D6 described in Description of the Related Art, the histogram equalization method is applied to the input image I. In this embodiment, the histogram equalization method is applied to the compression characteristic generating image S.

As described above, the compression characteristic generating section 22 is operable to generate the compression characteristic X(ib) by using a well-known histogram equalization method. This enables to configure the compression characteristic generating section 22 in a simplified manner, and generate a proper compression characteristic X(ib).

The dynamic range of the input image I to be inputted to the dynamic range compressor 15 may be optionally defined. The dynamic range compressor 15 is desirably adapted in the case where the input image I having a wide dynamic range is inputted.

The input image I having a wide dynamic range is generated as follows, for instance. First, the controller 6 controls the lens section 1 and the image sensor 2 for exposure control. Thereby, multiple images i.e. multi exposure images having different exposure amounts are picked up. Then, a wide dynamic range image generator 14A sums up the multiple images by applying a gain inversely proportional to the exposure value of the respective corresponding images to the multiple images to generate a wide dynamic range image. For instance, three frames of images respectively having exposure values of "1", "½", and "¼" are picked up. The gain "1" is applied to the image having the exposure value of "1". The gain "2" is applied to the image having the exposure value of "½". The gain "4" is applied to the image having the exposure value of "¼". Then, the images having the respective exposure values after application of the gain are summed up to generate a wide dynamic range image. The wide dynamic range image generator 14A is provided posterior to the A/D converter 4 and anterior to the dynamic range compressor 15 in the image processor 5. FIG. 1 shows an example, wherein the wide dynamic range image generator 14A is provided anterior to the dynamic range compressor 15.

Figure 9:
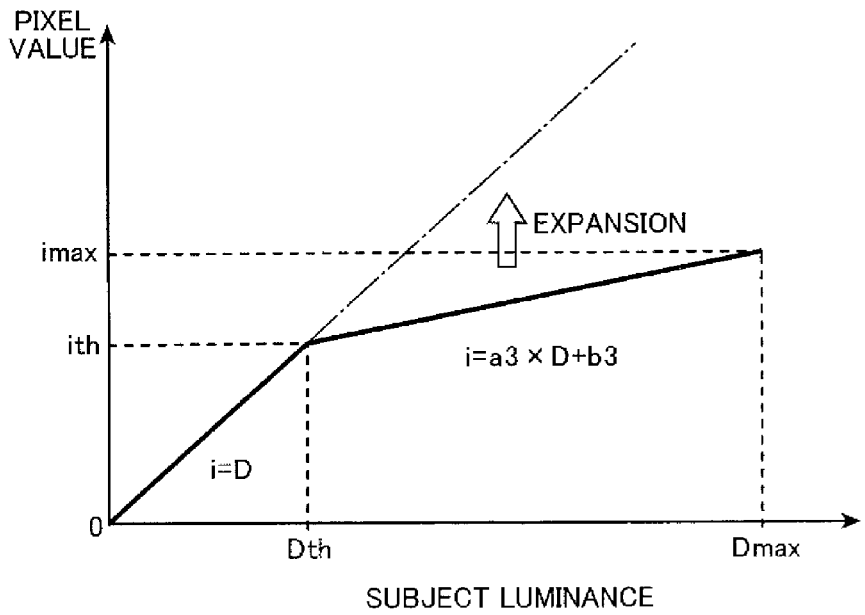
FIG. 9 is a diagram showing a photoelectric conversion characteristic of an image sensor having a knee characteristic, and a manner as to how the photoelectric conversion characteristic is expanded.

As another example, the input image I having a wide dynamic range image may be generated as follows. FIG. 9 is a diagram showing a photoelectric conversion characteristic of an image sensor having a knee characteristic, and a manner as to how the photoelectric conversion characteristic is expanded. In FIG. 9, the axis of abscissas indicates a subject luminance, and an axis of ordinate indicates a pixel value. In FIG. 9, the solid line indicates a photoelectric conversion characteristic of the image sensor 2 itself, and the one-dotted-chain line indicates a photoelectric conversion characteristic obtained by converting the photoelectric conversion characteristic in a high luminance range into a photoelectric conversion characteristic extending from the photoelectric conversion characteristic in a low luminance range.

First, an image sensor having a knee characteristic is used as the image sensor 2. In the image sensor having the knee characteristic, a photoelectric conversion characteristic showing a correlation between the subject luminance D and the pixel value (i) of the image sensor 2 is divided into a first photoelectric conversion characteristic in a low luminance range, and a second photoelectric conversion characteristic in a high luminance range with respect to a predetermined threshold value Dth. In the case where the subject luminance D lies in the low luminance range from 0 to the predetermined threshold value Dth, the subject luminance D is photoelectrically converted into the pixel value (i) by a first gradient. In the case where the subject luminance D lies in the high luminance range from the predetermined threshold value Dth to the maximum value Dmax for photoelectric conversion by the image sensor 2, the subject luminance D is photoelectrically converted into the pixel value (i) by a second gradient smaller than the first gradient, and in such a manner that the pixel value (i) is continued at the subject luminance Dth. In other words, the photoelectric conversion characteristic in the high luminance range is strongly compressed, as compared the photoelectric conversion characteristic in the low luminance range. In the example shown in FIG. 9, the first gradient is set to 1, and the second gradient is set to a3 ($0<a3<1$). An image picked up by the image sensor 2 with the knee characteristic having the above arrangement is converted and expanded by a wide dynamic range image generator 14B in such a manner that the photoelectric conversion characteristic in the high luminance range extends from the photoelectric conversion characteristic in the low luminance range, whereby a wide dynamic range image is generated.

More specifically, in the case where the photoelectric conversion characteristic in a wide luminance range is expressed by an equation: $i=a3\times D+b3$ ($b3=ith-a3\times Dth$), when the pixel value (i) is from 0 to the pixel value (ith) corresponding to the predetermined threshold value Dth, the pixel value (i) of the image sensor 2 is applied as it is; and when the pixel value (i) is from the pixel value (ith) to the pixel value (imax) corresponding to the maximum value Dmax, the pixel value (i) of the image sensor 2 is converted to $(i-b3)/a3$, whereby a wide dynamic range image is generated. The wide dynamic range image generator 14B is provided posterior to the A/D converter 4 and anterior to the dynamic range compressor 15 in the image processor 5. FIG. 1 shows an example, wherein the wide dynamic range image generator 14B is provided anterior to the dynamic range compressor 15.

Figure 10:
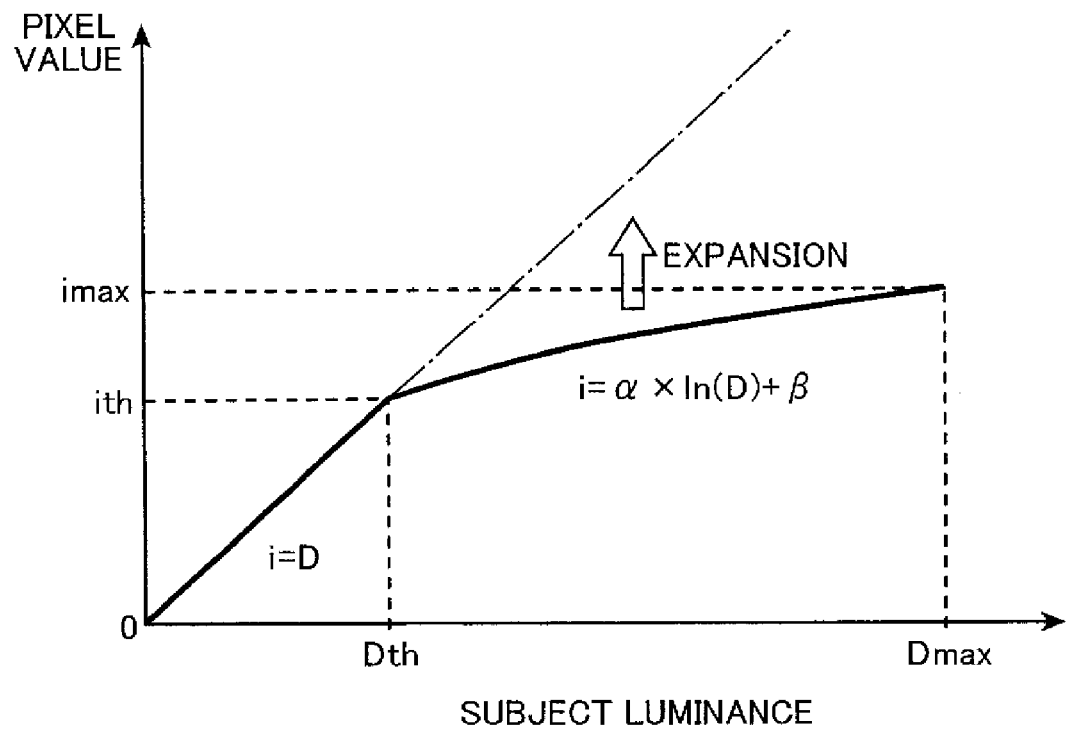
FIG. 10 is a diagram showing a photoelectric conversion characteristic of an image sensor having a linear-logarithmic characteristic, and a manner as to how the photoelectric conversion characteristic is expanded.

As yet another example, the input image I having a wide dynamic range image may be generated as follows. FIG. 10 is a diagram showing a photoelectric conversion characteristic of an image sensor having a linear-logarithmic characteristic, and a manner as to how the photoelectric conversion characteristic is expanded. In FIG. 10, the axis of abscissas indicates a subject luminance, and the axis of ordinate indicates a pixel value. In FIG. 10, the solid line indicates a photoelectric conversion characteristic of the image sensor 2 itself, and the one-dotted-chain line indicates a photoelectric conversion characteristic obtained by converting a photoelectric conversion characteristic in a high luminance range into a photoelectric conversion characteristic extending from a photoelectric conversion characteristic in a low luminance range.

First, an image sensor having a linear-logarithmic characteristic is used as the image sensor 2. In the image sensor having the linear-logarithmic characteristic, a photoelectric conversion characteristic showing a correlation between the subject luminance D and the pixel value (i) of the image sensor 2 is divided into a first photoelectric conversion characteristic in a low luminance range, and a second photoelectric conversion characteristic in a high luminance range with respect to a predetermined threshold value Dth. In the case where the subject luminance D lies in the low luminance range from 0 to the predetermined threshold value Dth, the subject luminance D is linearly and photoelectrically converted into the pixel value (i). In the case where the subject luminance D lies in the high luminance range from the predetermined threshold value Dth to the maximum value Dmax for photoelectric conversion by the image sensor 2, the subject luminance D is logarithmically and photoelectrically converted into the pixel value (i) in such a manner that the pixel value (i) is continued at the subject luminance Dth. In other words, the photoelectric conversion characteristic in the high luminance range is strongly compressed, as compared with the photoelectric conversion characteristic in the low luminance range. In the example shown in FIG. 10, the first photoelectric conversion characteristic in the low luminance range, as a linear photoelectric conversion characteristic, is expressed by an equation: $i=D$; and the second photoelectric conversion characteristic in the high luminance range, as a logarithmic photoelectric conversion characteristic, is expressed by an equation: $i=\alpha\times\ln(D)+\beta$ ($\beta=ith-\alpha\times\ln(Dth)$). An image picked up by the image sensor 2 having the linear-logarithmic characteristic as described above is converted and expanded by a wide dynamic range image generator 14C in such a manner that the photoelectric conversion characteristic in the high luminance range extends from the photoelectric conversion characteristic in the low luminance range, whereby a wide dynamic range image is generated.

More specifically, in the case where the first and the second photoelectric conversion characteristics are expressed as described above, when the pixel value (i) is from 0 to the pixel value (ith) corresponding to the predetermined threshold value Dth, the pixel value (i) of the image sensor 2 is applied as it is, and when the pixel value (i) is from the pixel value (ith) to the pixel value (imax) corresponding to the maximum value Dmax, the pixel value (i) of the image sensor 2 is converted to $\exp((i-\beta)/\alpha)$, whereby a wide dynamic range image is generated. The wide dynamic range image generator 14C is provided posterior to the A/D converter 4 and anterior to the dynamic range compressor 15 in the image processor 5. FIG. 1 shows an example, wherein the wide dynamic range image generator 14C is provided anterior to the dynamic range compressor 15.

The input image I having a wide dynamic range may be the one obtained by a well-known method e.g. one of the methods disclosed in D1 through D4.

As described above, in the image pickup apparatus CA incorporated with the image processing device embodying the invention, multiple smoothed images having space frequency components different from each other and resolutions i.e. data sizes or pixel numbers different from each other are generated based on the input image I by differentiating the cutoff frequencies. The compression characteristic X(ib) is generated based on one of the smoothed images. Thereby, a proper compression characteristic X(ib) is advantageously defined. This enables to compress the dynamic range of the input image I with high quality, as compared with the background art, with no or less image degradation resulting from e.g. overexposure or underexposure. The base component image generating section in the input image blurring section 21 (or the base component image generating step S1), and the compression characteristic generating section 22 (or the compression characteristic generating step S2) jointly use the smoothed images. Accordingly, the smoothed image generating section in the input image blurring section 21 (or the smoothed image generating step) can be used both as a preprocessor for the base component image generating section (or the base component image generating step), and a preprocessor for the compression characteristic generating section 22 (or the compression characteristic generating step). This enables to configure the image processing device and the image processing method in a simplified manner, as compared with an arrangement of generating the compression characteristic X(ib) based on the input image I or the base component image L.

In particular, in this embodiment, the dynamic range compressor 15 generates the compression characteristic X(ib), based on the compression characteristic generating image S having the feature of the input image I, in other words, having the feature of the base component image L or an intermediate base component image to be generated in the course of generating the base component image L; compresses the base component image L by using the compression characteristic X(ib); and generates an image, in which the dynamic range of the input image I is compressed, by using the compressed base component image Ls obtained by compressing the base component image L. The above arrangement enables to obtain a high-quality image, in which the base component image L is properly compressed, and the dynamic range of the input image I is compressed.

In the foregoing embodiment, the input image blurring section 21 is not limited to the arrangement shown in FIG. 2. For instance, the image processing device disclosed in D6 may be applied as follows. The image processing device disclosed in D6 is described in detail in Description of the Related Art. In the following, a modified arrangement of the embodiment is described by briefly describing the arrangement and the operation of the image processing device disclosed in D6.

Figure 11:
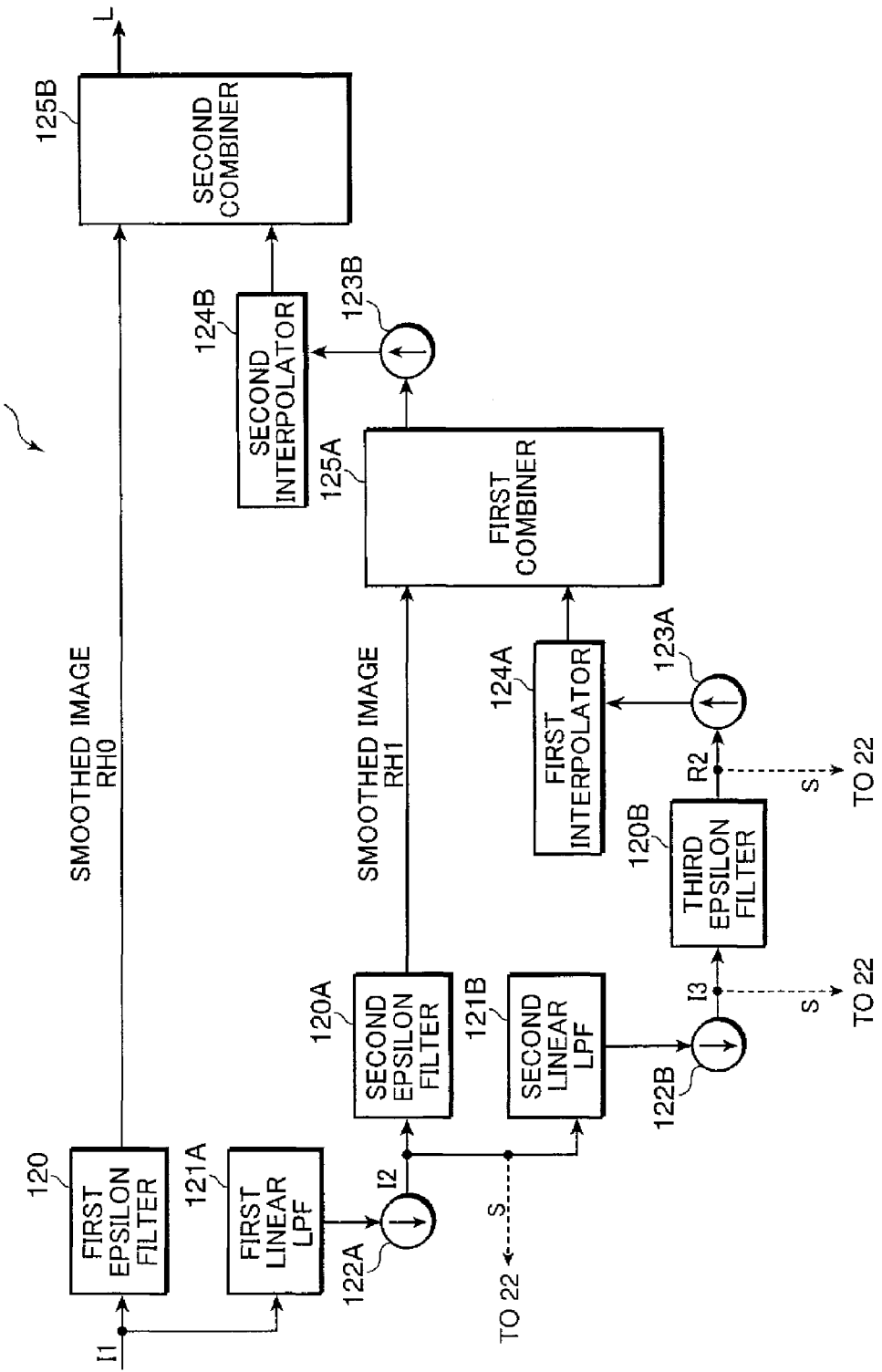
FIG. 11 is a diagram showing another arrangement example of the input image blurring section in the dynamic range compressor.
Figure 12:
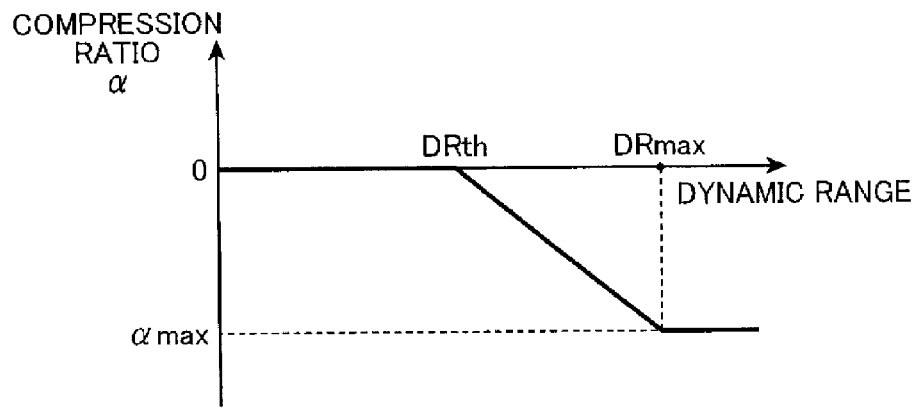
FIG. 12 is a diagram for describing a compression ratio to be used in dynamic range compression processing in the image processing method disclosed in D5.
Figure 13A:
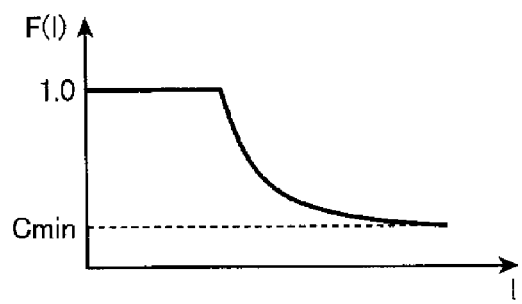
FIGS. 13A and 13B are diagrams for describing a coefficient to be used in dynamic range compression processing in the image processing method disclosed in D6.
Figure 13B:
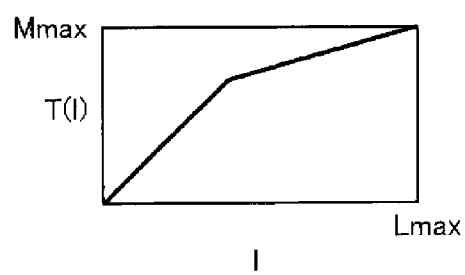

FIG. 11 is a diagram showing another arrangement example of the input image blurring section in the dynamic range compressor in the embodiment. Referring to FIG. 11, an input image blurring section 21B includes a first epsilon filter 120, a second epsilon filter 120A, and a third epsilon filter 120B; a first linear low-pass filter (linear LPF) 121A and a second linear LPF 121B; a first downsampler 122A and a second downsampler 122B; a first upsampler 123A and a second upsampler 123B; a first interpolator 124A and a second interpolator 124B; and a first combiner 125A and a second combiner 125B.

An input image I1 is divided and inputted to the first epsilon filter 120 and the first linear LPF 121A. The first epsilon filter 120 performs predetermined non-linear filter processing with respect to the input image I1 to generate a first smoothed image RH0 having a lowest degree of smoothness and a highest resolution, and outputs the first smoothed image RH0 to the second combiner 125B. The first linear LPF 121A is provided to suppress generation of aliasing noise in downsampling processing by the first downsampler 122A provided posterior to the first linear LPF 121A. The first linear LPF 121A performs proper filter processing depending on the downsampling rate. The output from the first linear LPF 121A is inputted to the first downsampler 122A, which, in turn performs downsampling processing at a predetermined sampling rate. An image I2 whose size is reduced by the first linear LPF 121A and the first downsampler 122A is inputted to the second epsilon filter 120A and the second linear LPF 121B.

The second epsilon filter 120A and the second linear LPF 121B respectively perform substantially the same operation as the first epsilon filter 120 and the first linear LPF 121A except that the size of the input image I is different, in other words, the image I2 is inputted from the first downsampler 122A, as the input image I. Specifically, the second epsilon filter 120A performs predetermined non-linear filter processing with respect to the input image I2 inputted from the first downsampler 122A to generate a second smoothed image RH1, and outputs the second smoothed image RH1 to the first combiner 125A. The second linear LPF 121B performs proper filter processing depending on the downsampling rate to be used in the second downsampler 122B provided posterior to the second linear LPF 121B. The output from the second linear LPF 121B is inputted to the second downsampler 122B, which, in turn performs downsampling processing at a predetermined sampling rate. An image I3 whose size is reduced by the second linear LPF 121B and the second downsampler 122B is inputted to the third epsilon filter 120B.

The third epsilon filter 120B performs substantially the same operation as the first epsilon filter 120. Specifically, the third epsilon filter 120B performs predetermined non-linear filter processing with respect to the input image I3 to be outputted from the second downsampler 122B to generate a third smoothed image RH2, and outputs the third smoothed image RH2 to the first upsampler 123A.

The first upsampler 123A performs upsampling processing with respect to the third smoothed image RH2 at the same sampling rate as the sampling rate to be used in the second downsampler 122B. Specifically, in the case where the downsampling rate to be used in the second downsampler 122B is 1/N, the first upsampler 123A performs processing of inserting (N−1) pixels whose pixel value is 0 between the adjacent pixels. The first interpolator 124A performs proper interpolation processing with respect to the upsampled image to generate an intermediate combined image, and outputs the intermediate combined image to the first combiner 125A. The first combiner 125A calculates an edge intensity G, and combines the second smoothed image RH1 outputted from the second epsilon filter 120A, and the intermediate combined image outputted from the first interpolator 124A based on the calculated edge intensity G to generate a first combined smoothed image, and outputs the first combined smoothed image to the second upsampler 123B.

The second upsampler 123B and the second interpolator 124B respectively perform substantially the same operation as the first upsampler 123A and the first interpolator 124A. An intermediate combined image generated by the second upsampler 123B and the second interpolator 124B is outputted to the second combiner 125B. The second combiner 125B performs substantially the same operation as the first combiner 125A. Specifically, the second combiner 125A combines the first smoothed image RH0 outputted from the first epsilon filter 120, and the intermediate combined image outputted from the second interpolator 124B to generate a second combined smoothed image, as a final base component image representing a base component, and outputs the second combined smoothed image.

As described above, the input image blurring section 21B divides the input image I1 for output, performs smoothing processing with respect to each of the divided multiple images I, and generates the smoothed images RH0, RH1, and RH2 whose degree of smoothness is different from each other. Then, the base component image generating section in the input image blurring section 21B calculates the edge intensity G based on the smoothed images RH0, RH1, and RH2, and generates the final base component image L representing a base component by combining the smoothed images RH0, RH1, and RH2 based on the calculated edge intensity G.

The input image blurring section 21B defines the input or the output of the third epsilon filter 120B as the compression characteristic generating image S; or defines the output of the first downsampler 122A as the compression characteristic generating image S. Thus, one of the compression characteristic generating images S is selected, and the selected compression characteristic generating image S is outputted from the input image blurring section 21B to the compression characteristic generating section 22. This is further advantageous in generating a proper compression characteristic.

Similarly to the input image blurring section 21A, the input image blurring section 21B may be configured in such a manner that one of the compression characteristic generating images S is selected based on the space frequencies of the compression characteristic generating images S. Since the above modification enables to generate a compression characteristic based on a proper compression characteristic generating image S, the above modification is more advantageous in generating a proper compression characteristic.

In the foregoing embodiment, an arrangement, wherein the dynamic range compressor 15 is operable to generate the reflectance component image R based on the input image I and the base component image L, and generate the compressed image Is based on the compressed base component image Ls and the reflectance component image R, is described as an arrangement example of generating the compressed image Is based on the base component image L and the compressed base component image Ls. Alternatively, an arrangement other than the above may be applied. For instance, the input image I is expressed by: I=L×R, and the compressed image Is is expressed by: Is=Ls×R. Accordingly, Is=(Ls/L)×I. The dynamic range compressor 15 may divide the compressed base component image Ls by the base component image L, and multiply the quotient by the input image I. In the modification, the dynamic range compressor 15 is constituted of the input image blurring section 21; the compression characteristic generating section 22; the base component image compressing section 23; and a divider/multiplier operable to receive the input image I, the base component image L, and the compressed base component image Ls, divide the compressed base component image Ls by the base component image L, and multiply the quotient by the input image I.

The specification discloses the aforementioned arrangements. The following is a summary of the primary arrangements of the embodiment.

An image processing device according to an aspect of the invention includes: a smoothed image generating section for generating multiple smoothed images having space frequency components different from each other and resolutions different from each other, based on an input image, by differentiating cut-off frequencies; a base component image generating section for generating a base component image having a resolution equal to a resolution of the input image, based on the multiple smoothed images; a compression characteristic generating section for generating a compression characteristic for use in compressing the base component image, based on one of the multiple smoothed images; and a base component image compressing section for applying the compression characteristic generated in the compression characteristic generating section to the base component image to generate a compressed base component image having a dynamic range smaller than a dynamic range of the base component image.

An image processing method according to another aspect of the invention includes: a smoothed image generating step of generating multiple smoothed images having space frequency components different from each other and resolutions different from each other, based on an input image, by differentiating cut-off frequencies; a base component image generating step of generating a base component image having a resolution equal to a resolution of the input image, based on the multiple smoothed images; a compression characteristic generating step of generating a compression characteristic for use in compressing the base component image, based on one of the multiple smoothed images; and a base component image compressing step of applying the compression characteristic generated in the compression characteristic generating step to the base component image to generate a compressed base component image having a dynamic range smaller than a dynamic range of the base component image.

In the image processing device and the image processing method having the above arrangement, the multiple smoothed images having the space frequency components different from each other and the resolutions i.e. data sizes or pixel numbers different from each other are generated based on the input image by differentiating the cut-off frequencies; and the compression characteristic for use in compressing the base component image is generated based on one of the multiple smoothed images. Thereby, a proper compression characteristic is advantageously defined. This enables to compress the dynamic range of the input image with high quality, as compared with the background art, with no or less image degradation resulting from e.g. overexposure or underexposure. Also, the base component image generating section (or the base component image generating step), and the compression characteristic generating section (or the compression characteristic generating step) jointly use the smoothed images. Accordingly, the smoothed image generating section (or the smoothed image generating step) is operable both as a preprocessor for the base component image generating section (or the base component image generating step) and a preprocessor for the compression characteristic generating section (or the compression characteristic generating step). This enables to configure the image processing device and the image processing method in a simplified manner, as compared with an arrangement of generating a compression characteristic based on an input image or a base component image.

In the above arrangement, the smoothed image generating section may include a low-pass filter section for performing low-pass filter processing with respect to the input image at a predetermined cut-off frequency to generate a low space frequency image having a space frequency component whose frequency is lower than the cut-off frequency; and a downsampling section for downsampling the low space frequency image at a predetermined first rate to generate a low resolution image i.e. a smoothed image having a resolution smaller than the resolution of the input image, wherein the multiple smoothed images are generated by repeating the low-pass filter processing by the low-pass filter section and the downsampling processing by the downsampling section with respect to the input image a predetermined number of times.

Further alternatively, the multiple smoothed images generated in the smoothed image generating section may be defined as multiple blurred images; and the base component image generating section may include an upsampling section for upsampling one of the blurred images at a second rate depending on the first rate to generate an upsampled resolution image; and a blurred image combining section for combining the upsampled resolution image obtained by the upsampling processing by the upsampling section, and a blurred image having a resolution equal to the resolution of the upsampled resolution image to generate a combined blurred image, wherein the base component image is generated by repeating the upsampling processing by the sampling section and the combining processing by the blurred image combining section with respect to the multiple blurred images the predetermined number of times. The smoothed image generating section having the above arrangement serves as a preprocessor for the base component image generating section. In the above arrangement, subjecting the input image to low-pass filter processing stage by stage enables to utilize a low-pass filter of a smaller filter size, as compared with a case that the input image is subjected to low-pass filter processing in a single stage. This enables to reduce the computation amount if a digital filter is used as the low-pass filter.

Further alternatively, the blurred image combining section in the base component image generating section may be operable to detect the edge intensity of an image obtained by upsampling processing by the upsampling section; apply the weights to the upsampled resolution image obtained by the upsampling processing by the upsampling section, and the blurred image having the resolution equal to the resolution of the upsampled resolution image, respectively; and combine i.e. sum up the weighted upsampled resolution image and the weighted blurred image. Performing the combining processing as described above enables to satisfactorily preserve an edge component in the base component image.

Preferably, the image processing device may further include a compressed image generating section for generating a compressed image having a dynamic range smaller than a dynamic range of the input image, based on the input image, the base component image, and the compressed base component image. Preferably, the image processing method may further include a compressed image generating step of generating a compressed image having a dynamic range smaller than a dynamic range of the input image, based on the input image, the base component image, and the compressed base component image.

In the above arrangement, since the image processing device is further provided with the compressed image generating section, or the image processing method is further provided with the compressed image generating step, the image processing device or the image processing method enables to generate a compressed image.

In the image processing device, preferably, the compression characteristic generating section may be operable to generate the compression characteristic by using a maximum value or a minimum value of a pixel value in one of the multiple smoothed images. In the compression characteristic generating step, preferably, the compression characteristic may be generated by using a maximum value or a minimum value of a pixel value in one of the multiple smoothed images.

The above arrangement enables to configure the compression characteristic generating section or the compression characteristic generating step in a simplified manner, and generate a proper compression characteristic.

In the image processing device, preferably, the compression characteristic generating section may be operable to generate the compression characteristic by using an average value of a pixel value and a degree of variation in the pixel value in one of the multiple smoothed images. In the image processing method, preferably, in the compression characteristic generating step, the compression characteristic may be generated by using an average value of the pixel value and a degree of variation in the pixel value in one of the multiple smoothed images.

The above arrangement enables to configure the compression characteristic generating section or the compression characteristic generating step in a simplified manner, and generate a proper compression characteristic.

In the image processing device, preferably, the compression characteristic generating section may be operable to generate the compression characteristic by using a histogram of a pixel value in one of the multiple smoothed images. In the image processing method, preferably, in the compression characteristic generating step, the compression characteristic may be generated by using a histogram of a pixel value in one of the multiple smoothed images.

The above arrangement enables to configure the compression characteristic generating section or the compression characteristic generating step in a simplified manner, and generate a proper compression characteristic.

In the image processing device, preferably, the compression characteristic generating section may be operable to select one of the multiple smoothed images based on a space frequency of the input image or the base component image to generate the compression characteristic based on the selected smoothed image. In the image processing method, preferably, in the compression characteristic generating step, one of the multiple smoothed images may be selected based on a space frequency of the input image or the base component image to generate the compression characteristic based on the selected smoothed image.

In the above arrangement, since one of the smoothed images is selected based on the space frequency of the input image or the base component image, a proper smoothed image can be selected in generating the compression characteristic. Also, since the compression characteristic is generated based on the proper smoothed image, a proper compression characteristic can be more advantageously generated.

An image pickup apparatus according to still another aspect of the invention includes: an image pickup section for generating an image signal by photoelectric conversion of a subject light image; and an image processing section for applying a predetermined image processing with respect to the image signal generated in the image pickup section to generate an image, wherein the image processing section has one of the aforementioned image processing devices.

The above arrangement enables to provide an image pickup apparatus capable of properly compressing the dynamic range of a picked-up image in a simplified manner and with high quality, as compared with the background art.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing device, comprising:
  a smoothed image generating section for generating multiple smoothed images having space frequency components different from each other and resolutions different from each other, based on an input image, by differentiating cut-off frequencies;
  a base component image generating section for generating a base component image having a resolution equal to a resolution of the input image, based on the multiple smoothed images;
  a compression characteristic generating section for generating a compression characteristic being uniquely determined by coordinate values of two terminal points and a coordinate value of a point between the two terminal points, the compression characteristic for use in compressing the base component image, the compression characteristic generating section generating the coordinate value of at least one of the three points based on one of the multiple smoothed images, the coordinate values indicated by two axes of pixel value before compression and pixel value after compression;
  a base component image compressing section for applying the compression characteristic generated in the compression characteristic generating section to the base component image to generate a compressed base component image having a dynamic range smaller than a dynamic range of the base component image; and
  a compressed image generating section for generating a compressed image having a dynamic range smaller than a dynamic range of the input image, the compressed image generating section dividing the input image by the base component image and then adding thereto the compressed base component image to generate the compressed image.

2. The image processing device according to claim 1, wherein the compression characteristic generating section is operable to generate the compression characteristic by using a maximum value or a minimum value of a pixel value in one of the multiple smoothed images.

3. The image processing device according to claim 1, wherein the compression characteristic generating section is operable to generate the compression characteristic by using an average value of a pixel value and a degree of variation in the pixel value in one of the multiple smoothed images.

4. The image processing device according to claim 1, wherein the compression characteristic generating section is operable to generate the compression characteristic by using a histogram of a pixel value in one of the multiple smoothed images.

5. The image processing device according to claim 1, wherein the compression characteristic generating section is operable to select one of the multiple smoothed images based on a space frequency of the input image or the base component image to generate the compression characteristic based on the selected smoothed image.

6. An image processing method, comprising:
  a smoothed image generating step of generating multiple smoothed images having space frequency components different from each other and resolutions different from each other, based on an input image, by differentiating cut-off frequencies;
  a base component image generating step of generating a base component image having a resolution equal to a resolution of the input image, based on the multiple smoothed images;
  a compression characteristic generating step of generating a compression characteristic being uniquely determined by coordinate values of two terminal points and a coordinate value of a point between the two terminal points, the compression characteristic for use in compressing the base component image, the compression characteristic generating section generating the coordinate value of at least one of the three points based on one of the multiple smoothed images, the coordinate values indicated by two axes of pixel value before compression and pixel value after compression;
  a base component image compressing step of applying the compression characteristic generated in the compression characteristic generating step to the base component image to generate a compressed base component image having a dynamic range smaller than a dynamic range of the base component image; and
  a compressed image generating step comprising dividing the input image by the base component image and then adding thereto the compressed base component image to generate a compressed image.

7. The image processing method according to claim 6, wherein in the compression characteristic generating step, the compression characteristic is generated by using a maximum value or a minimum value of a pixel value in one of the multiple smoothed images.

8. The image processing method according to claim 6, wherein in the compression characteristic generating step, the compression characteristic is generated by using an average value of the pixel value and a degree of variation in the pixel value in one of the multiple smoothed images.

9. The image processing method according to claim 6, wherein in the compression characteristic generating step, the compression characteristic is generated by using a histogram of a pixel value in one of the multiple smoothed images.

10. The image processing method according to claim 6, wherein in the compression characteristic generating step, one of the multiple smoothed images is selected based on a space frequency of the input image or the base component image to generate the compression characteristic based on the selected smoothed image.

11. An image pickup apparatus, comprising:
  an image pickup section for generating an image signal by photoelectric conversion of a subject light image; and
  an image processing section for applying a predetermined image processing with respect to the image signal generated in the image pickup section to generate an image,
  the image processing section including:
  a smoothed image generating section for generating multiple smoothed images having space frequency components different from each other and resolutions different from each other, based on an input image, by differentiating cut-off frequencies;
  a base component image generating section for generating a base component image having a resolution equal to a resolution of the input image, based on the multiple smoothed images;

a compression characteristic generating section for generating a compression characteristic being uniquely determined by coordinate values of two terminal points and a coordinate value of a point between the two terminal points, the compression characteristic for use in compressing the base component image, the compression characteristic generating section generating the coordinate value of at least one of the three points based on one of the multiple smoothed images, the coordinate values indicated by two axes of pixel value before compression and pixel value after compression; and a base component image compressing section for applying the compression characteristic generated in the compression characteristic generating section to the base component image to generate a compressed base component image having a dynamic range smaller than a dynamic range of the base component image; and a compressed image generating section for generating a compressed image having a dynamic range smaller than a dynamic range of the input image, the compressed image generating section dividing the input image by the base component image and then adding thereto the compressed base component image to generate the compressed image.

* * * * *